United States Patent [19]

Music et al.

[11] Patent Number: 4,847,677
[45] Date of Patent: Jul. 11, 1989

[54] VIDEO TELECOMMUNICATION SYSTEM AND METHOD FOR COMPRESSING AND DECOMPRESSING DIGITAL COLOR VIDEO DATA

[75] Inventors: John Music, Irvine; Gordon H. Smith, Santa Ana; James L. Thomas, Placentia, all of Calif.

[73] Assignee: Universal Video Communications Corp., Irvine, Calif.

[21] Appl. No.: 187,046

[22] Filed: Apr. 27, 1988

[51] Int. Cl.[4] ............................................. H04N 11/04
[52] U.S. Cl. .................................. 358/13; 358/133; 358/135; 358/136
[58] Field of Search ...................... 358/11, 12, 13, 133, 358/134, 135, 136, 138; 375/122

[56] References Cited

U.S. PATENT DOCUMENTS

| | | | |
|---|---|---|---|
| 3,414,677 | 12/1968 | Quinlan | 358/133 |
| 3,609,244 | 9/1971 | Mounts | 375/122 |
| 3,767,847 | 10/1973 | Haskell et al. | 358/135 |
| 3,950,607 | 4/1976 | Southworth et al. | 358/134 |
| 3,976,831 | 8/1976 | Dannell | 358/138 |
| 3,980,830 | 9/1976 | Wendland et al. | 358/133 |
| 3,982,063 | 9/1976 | Brown et al. | 358/133 |
| 4,004,084 | 1/1977 | Brown et al. | 358/133 |
| 4,027,331 | 5/1977 | Nicol | 358/135 |
| 4,058,835 | 11/1977 | Kennedy | 358/134 |
| 4,060,832 | 11/1977 | Devimeux et al. | 358/133 |
| 4,090,221 | 5/1978 | Connor | 358/166 |
| 4,179,709 | 12/1979 | Workman | 358/133 |
| 4,210,927 | 7/1980 | Yumde et al. | 358/12 |
| 4,222,076 | 9/1980 | Knowlton | 358/133 |
| 4,261,018 | 4/1981 | Knowlton | 358/133 |
| 4,302,775 | 11/1981 | Widergren et al. | 358/136 |
| 4,306,249 | 12/1981 | Croll | 358/133 |
| 4,323,916 | 4/1982 | Dischert et al. | 358/13 |
| 4,365,273 | 12/1982 | Yamada et al. | 358/260 |
| 4,394,774 | 7/1983 | Widergren et al. | 382/56 |
| 4,420,771 | 12/1983 | Pirsch | 358/261 |
| 4,455,571 | 6/1984 | Shimizu et al. | 358/138 |
| 4,468,708 | 8/1984 | Coleman, Jr. | 358/310 |
| 4,485,400 | 11/1984 | Lemelson et al. | 358/85 |
| 4,494,144 | 1/1985 | Brown | 358/133 |
| 4,541,012 | 9/1985 | Tescher | 358/133 |
| 4,546,383 | 10/1985 | Abramatic et al. | 358/85 |
| 4,573,074 | 2/1986 | Alaria et al. | 358/136 |
| 4,589,110 | 5/1986 | Eng et al. | 358/133 |
| 4,597,010 | 6/1986 | Carr | 358/136 |
| 4,605,963 | 8/1986 | Reitmeier et al. | 358/133 |
| 4,633,296 | 12/1986 | Cham et al. | 358/12 |
| 4,633,311 | 12/1986 | Gordon et al. | 358/133 |
| 4,654,484 | 3/1987 | Reiffel et al. | 379/53 |
| 4,654,695 | 3/1987 | Fling | 358/11 |
| 4,656,511 | 4/1987 | Koga | 358/136 |
| 4,740,832 | 4/1988 | Sprague | 358/13 |
| 4,758,881 | 7/1988 | Laspada | 358/13 |
| 4,772,938 | 9/1988 | Sasson | 358/13 |
| 4,772,956 | 9/1988 | Roche | 358/133 |
| 4,774,562 | 9/1988 | Chen | 358/13 |
| 4,774,587 | 9/1988 | Schmitt | 358/133 |

OTHER PUBLICATIONS

Gerken & Schiller, "A Low Bit-Rate Image Sequence Coder Combining A Progressive DPCM On Interleaved Raster With A Hybrid DCT Technique", IEEE Journal on Selected Areas in Communications, vol. SAC-5, No. 7, Aug. 1987.

(List continued on next page.)

Primary Examiner—Howard W. Britton
Attorney, Agent, or Firm—Fulwider Patton Lee & Utecht

[57] ABSTRACT

The method and system of compressing and decompressing digital color video data in a video communication system utilizes a digital color video signal having three video color components, and involves the determination of a predetermined number of the most visually significant combinations of color components in a picture frame, and the encoding of the color components as compressed color codes in a series of run length and compressed color code combinations. Line-to-line differences and movement of edges and segments of the picture frames are determined, and frame-to-frame differences are also encoded to reduce the amount of information to a minimum. Further statistical encoding of at least a portion of the run length and color code combinations is also provided. The digitally compressed color component codes are decoded according to a look up table to form a table of the three digital color components for each run length, and the run lengths and corresponding color components are stored in an array in a buffer memory to represent the scan lines in a video picture frame.

92 Claims, 12 Drawing Sheets

OTHER PUBLICATIONS

Chen & Smith, "Adaptive Coding of Monochrome and Color Images", IEEE Transactions on Communication, vol. COM-25, No. 11, Nov. 19, 1977.

Kaneko, Hatori & Koike, "Improvements of Transform Coding Algorithm for Motion-Compensated Interframe Prediction Errors-DCT/SQ Coding," IEEE Journal on Selected Areas in Communications, vol. SAC-5, No. 7, Aug. 1987.

Kato, Mukawa & Okubo, "A Motion Picture Coding Algorithm Using Adaptive DCT Encoding Based on Coefficient Power Distribution Classification," vol. SAC-5, No. 7, Aug. 1987.

Heiman & Rose, "A Look-Up-Based Universal Real-Time Transformer for Image Coding", IEEE Journal on Selected Areas In Communications, vol. SAC-5, No. 7, Aug. 1987.

Moorehead II, Rajala & Cook, "Image Sequence Compression Using a Pel-Recursive Motion-Compensated Technique", IEEE Journal on Selected Areas In Communications, vol. SAC-5, No. 7, Aug. 1987.

VIDEO TELECOMMUNICATION SYSTEM AND METHOD FOR COMPRESSING AND DECOMPRESSING DIGITAL COLOR VIDEO DATA

BACKGROUND OF THE INVENTION

1. Field of the Invention

This invention relates generally to information signal processing, and in particular to the field of processing time sequential information signals, such as video signals, for the purpose of reducing the amount of information to be transferred from an encoding site to a decoding site. A particular use of the invention is in the communication of color video data over telephone lines for purposes of video telecommunications

2. Prior Art

Encoding of digital television signals ordinarily requires a transmission rate of approximately 200 Mbits/s. Recent developments in coding systems have permitted the transmission rate to be cut to less than 2 Mbits/s. Coding systems using block oriented analysis of video picture frames and processing by a conventional hybrid discrete cosine transform (DCT) coefficient permit transmission at rates of between 64 Kbits/s and 384 Kbits/s. Such a system is described in Gerken and Schiller, "A Low Bit-Rate Image Sequence Coder Combining A Progressive DPCM On Interleaved Rasters with A Hybrid DCT Technique", IEEE Journal on Selected Areas in Communications, Vol. SAC-5, No. 7, August, 1987. Adaptive coding techniques applied to such DCT processing have allowed video data transmission at rates as low as one to two bits per pixel, as is described in Chen and Smith, "Adaptive Coding of Monochrome and Color Images", IEEE Transactions on Communications, Vol. COM-25, No. 11, Nov. 19, 1977. However, information transmitted at such low data rates seriously affects the ability to reconstruct a sufficient number of frames per second so that a real time picture is acceptable to a viewer. High capacity telephone lines are available which will carry transmissions at a rate of up to 1.544 Mbits/s, but such lines are extremely expensive at a dedicated use rate, and are still quite expensive at a scheduled use rate. Lower capacity telephone lines are available which permit transmission at rates of up to 56 Kbits/s and 64 Kbits/s. Relatively expensive video digital and coding devices are commercially available which will transmit a video signal at 56,000 bits per second, so that it is necessary to utilize a combination of a device of this nature with the high capacity 1.544 Mbits/s telephone line to allow a framing speed much faster than about one frame per second. The current transmission rate limit of ordinary telephone lines approaches 18,000 bits per second, so that transmission of real time sequencing of video pictures over ordinary telephone lines has been viewed in the prior art as not being feasible.

Various schemes for reducing the amount of redundancy of information to be transmitted in a digital video signal have been used. One technique is to utilize a slow scan camera; and another technique is to transmit every nth scanning line for each frame. Another technique involves the sending of only those parts of a picture frame which are deemed to be important or to have changed in some significant manner, by dividing the picture frame into a number of segments or blocks which are typically 3×3 or 4×4 groups of pixels, and analyzing the content of the blocks. These techniques tend to also reduce the resolution of the video picture.

Another technique in the reduction of transmission time which does not decrease the resolution of a picture transmitted is run length encoding. In run length encoding, the scan lines of a picture frame are encoded as a value of the color content of a series of pixels and the length of the sequence of pixels having that value or range of values. The values may be a measure of the amplitude of a video signal, or other properties of such video signals, such as luminance or chrominance. An example of a system which utilizes run length coding of amplitude of video signals is U.S. Pat. No. 3,609,244 (Mounts). In that system, a frame memory also determines frame to frame differences, so that only those differences from one frame to the next are to be transmitted. Another example of a method for transmitting video signals as compressed run length values which also utilizes statistical coding of frequent values to reduce the number of bits required to represent data is U.S. Pat. No. 4,420,771 (Pirsch).

Ideally, compression of color video information to allow real time sequencing of picture frames at a rate of up to 15 frames per second, and at bit rates as low as 11,500 bits per second would be desirable, to allow the communication of color video data over ordinary telephone lines. A video data compression system able to achieve equivalent data transmission rates as systems using higher quality telephone lines with more efficient and less costly equipment than is currently available would also be desirable.

SUMMARY OF THE INVENTION

The present invention provides for a method and system for compressing digital color video data in a video communication system, for transmitting a plurality of video picture frames from digitized color video signals in the form of a code for run lengths and a code representing three digital color components. A luminance function is utilized to determine differences in the luminance of pixels in the scan lines of the picture, to determine run lengths of sequentially related pixels in the scan lines. The pixels in the scan lines are then coded as a series of run lengths of digitally reduced color values, and thereafter subsequent pictures are encoded as changes in the run lengths of color values from a previous picture frame to a current picture frame.

The present invention also provides for a method and system of decompressing color video data in a video communication system which receives a plurality of digitized signals representing pixel coded changes from one picture frame to another of run lengths and digitally compressed color component codes. The system includes a look up table of the digitally compressed color component codes representing combinations of three corresponding digital color components. The digitally compressed color codes are decoded according to the look up table to form a table of the three digital color components for each of the run lengths, and the run lengths and corresponding color components are stored in an array in a buffer memory to represent run length and color component data for the scan lines in a video picture frame. The run length and color component data are dynamically mapped via a drawing engine to a display.

Briefly, and in general terms, the method of compressing digital color video data utilizes a digitized color video signal having three digital color components and a run length component. The steps of the method comprise determining a luminance function for each pixel based upon the digital color signals; determining at least one decision parameter based upon the luminance function differences between pixels a given distance from one another; comparing at least one of the decision parameters with at least one corresponding threshold value to determine run lengths of sequentially related pixels, the run lengths being of a first digital word size, and the three color components being of second, third and fourth digital word sizes, respectively; encoding all of the digital color components in the picture frame according to a look up table as compressed color codes of the most visually significant color combinations of a fifth digital word size which is smaller than the sum of the second, third and fourth digital word sizes; encoding a plurality of combinations of run lengths and the digitally compressed color codes representing at least a portion of the picture frame; comparing said run lengths and digitally compressed color codes of said current picture frame with the run lengths and digitally compressed color codes of a previous picture frame to determine changes from said previous picture frame to said current frame; and encoding the changes from a previous picture frame to a current picture frame for at least a portion of the picture frames, whereby once an initial picture frame is encoded, only those changes in subsequent picture frames are encoded.

The system for compressing digital color video data is for use in a video communication system for transmitting a plurality of video picture frames, utilizing a digitized color video signal having a color portion representing combinations of three digital color components and a run length portion. The data compression system briefly and generally comprises means for determining a luminance function for each pixel based upon the digital color signals; means for determining at least one decision parameter based upon differences in said luminance function between pixels a given distance from one another; means for comparing said at least one decision parameter with one or more corresponding threshold values to determine run lengths of sequentially related pixels, said run lengths having a first digital word size and the three color components having second, third and fourth digital word sizes, respectively. Also included in the data compression system are means for encoding all of the digital color components in the picture frame according to a look up table of digitally compressed color codes of the most visually significant color combinations of a fifth digital word size which is smaller than the sum of the second, third and fourth digital word sizes; means for encoding a plurality of combinations of run lengths and associated digitally compressed color codes which represent at least a portion of the picture frame; means for comparing said run lengths and digitally compressed color codes of said current picture frame with the run lengths and digitally compressed color codes of a previous picture frame to determine changes from said previous picture frame to said current picture frame; and means for encoding changes from said previous picture frame to the current picture frame for at least a portion of said picture frames, whereby once an initial picture frame is encoded, only those changes in subsequent picture frames are encoded.

In a preferred embodiment of the method and system for data compression the digital color component signals are RGB, and the color component word sizes are equal. In one preferred embodiment the rate of change of the differences in luminance between pixels is determined and compared with a predetermined, adaptive threshold value. The digital word size of the digital color components is preferably initially six bits per each component color, and the luminance function is determined with an accuracy based upon the six bit digital color values. Thereafter the word size of the digital color components is reduced to four bits each, and the run length and color components are coded together as a bit stream of combined run length and color information in sixteen bit digital words. Preferably thereafter adjacent run lengths on each scan line for which the adjacent run lengths have associated color components which vary less than a predetermined amount are concatenated to a digital word size which is larger than the original digital word size of the run lengths. Either or both of the run length portion and the compressed color component code portion of the combinations of run length compressed color codes are preferably statistically encoded by determining the frequency of occurrence of values of either or both portions. A plurality of different code tables are provided. The most frequent occurrence of values in a portion is statistically encoded in a first code table by a one bit size digital word. The next three most frequent occurrences are selected and encoded in a second code table by a two bit digital size word, and all of the other values are likewise encoded in at least one additional code table by a digital word size larger than two bits. In the encoding of a table of changes, provision is also made for encoding line-to-line differences, frame-to-frame differences, and determining and encoding movement of distinctive edges of sequences of combinations of run lengths and compressed color codes from frame-to-frame.

Briefly and in general terms, the method for decompressing digital color video data in a video communication system which receives a plurality of digitized signals to represent changes from a previous picture to a current picture frame of combinations of a plurality of run lengths and digitally compressed color component codes, the system including a look up table of the digitally compressed color component codes for three corresponding digital color components, the combinations of run length and compressed color codes having a first digital word size, and the compressed color component codes having a second digital word size, comprises receiving the changes from a previous picture frame to a current picture frame of run length and compressed color component codes to be decompressed and decoded; decoding the digital compressed color component codes according to the look up table to form a table of the three digital color components corresponding to each run length; storing the run length and corresponding color components to an array in a buffer memory means of run length and color component data, representing the scan lines in the video picture frame; and generating a color video display signal comprising the three color component data for the picture frame from the run length and associated color components for the scan lines of the picture frame for each pixel of the picture frame by mapping the pixels in the run length from a starting pixel for the length to an end pixel of the run length to the end of the portion each scan line to be mapped.

The system of the invention for decompressing digital color video data in a video communication system utilizing the digitized signals representing changes from a previous picture frame to a current picture frame as combinations of run length and digitally compressed color component codes, and including a look up table for the digitally compressed color component codes, with the combinations of run length and digitally compressed color component codes being of a first digital word size, and the compressed color component code being of a second digital word size, briefly and generally comprises means for receiving the changes in the run length and compressed color component codes to be decompressed and decoded; means for decoding the digitally compressed color component codes according to the look up table of the three digital color components for each run length; means for storing the run length and corresponding color components to an array in a memory buffer of run length and color component data to represent the plurality of scan lines in the video picture frame; and means for generating a color video display signal comprising the three color component data from the run length and associated color components for the scan lines of the picture frame for each pixel of the picture frame by mapping the pixels in the run length from a starting pixel for the run length to an end pixel of the run length to the end of the portion of each scan line to be mapped.

In a preferred embodiment of the system and the method of the invention for decompressing digital color video data, the run length portions of the three color components for the scan lines of the picture frame are stored in a display buffer memory means which represents a compressed coding of the digital color components for each pixel of the picture frame. The pixels represented in the run length and color components are smoothly mapped from the compressed data in the display buffer memory to a pixel generator from a starting pixel for the run length to the end pixel of the run length, to the end of the portion at each scan line in the picture frame to be mapped. In a preferred embodiment the color portion of the coded digitized signal is converted into three digital color components each having a word size of six bits. In a most preferred embodiment the run length and associated color portions are alternately stored in a first buffer memory until a picture frame in that buffer memory is complete, the pixel generator is switched to display that picture, the run length and associated color components of a next picture frame are stored in a second buffer memory until the picture frame in the second buffer memory is complete, and the storage to the first and second buffer memories is repeated for subsequent picture frames. In the case in which the run length portion of the digitized signal has been concatenated, the method and system of the invention also involve the division of the concatenated run lengths and color component combinations into smaller, unconcatenated run length and digital color component combinations, before storing of the run length and color component information occurs. Each completed picture data point stored in one of the buffer memories is read out and converted by a drawing engine to a smoothly varying group of colors in a display format in synchronism with the video display to repeatedly generate a picture until the second buffer is filled. The drawing engine then switches to the second buffer to draw the next picture while the first buffer is being reloaded with the next picture in the sequence.

Furthermore, in brief and general terms, the invention involves the method of compressing and decompressing digital color video data in a video communication system for transmitting a plurality of video picture frames. The method briefly and generally comprises determining a luminance function for each pixel, determining at least one decision parameter based upon differences in said luminance function between pixels a given distance from one another; determining run lengths of sequentially related pixels based upon at least one of decision the decision parameters; the run lengths being of a first digital word size, and the three digital color components being of second, third and fourth digital word sizes, respectively; encoding all of the digital color components in the picture frame according to a look up table of digitally compressed color codes of the most visually significant color combinations of a fifth digital word size smaller than the sum of the second, third, and fourth digital word sizes; encoding a plurality of combinations of said run lengths and digitally compressed color codes representing at least a portion of the picture frame; comparing said run lengths and digitally compressed color codes of said current picture frame with the run lengths and digitally compressed color codes of a previous picture frame to determine changes from said previous picture frame to said current picture frame; and encoding said changes from said previous picture frame to said current picture frame; transmitting the coded changes in run lengths and compressed color codes; receiving the transmitted encoded changes of run lengths and compressed color codes to be decompressed and decoded; decoding the digitally compressed color component codes according to the look up table to form a table of the three digital color components for the run lengths; storing at least a portion of the run length corresponding color components in an array in a buffer memory of run length and color component data representing the scan lines in the video picture frame; and generating a color video display signal representing the three color components data from the run length and associated color components for the scan lines of the picture frame for each pixel of the picture frame by mapping the pixels in the run length from a starting pixel for the run length to an end pixel of the run length to the end of the portion each scan line to be mapped.

A further embodiment of the invention briefly and generally concerns a system for compressing and decompressing color video data in a video communication system for transmitting and receiving a plurality of video picture frames, with each picture frame comprising a plurality of scan lines composed of a plurality of pixels, utilizing a digitized color video signal having three digital color components. The system includes means for determining a luminance function for each pixel, means for determining at least one decision parameter based upon differences in luminance between pixels a given distance from one another; means for comparing at least one of the decision parameters with corresponding alterable thresholds to determine run lengths of sequentially related pixels, the run lengths being of a first digital word size, and the three digital color components being of second, third and fourth digital word sizes, respectively; means for encoding all of the digital color components in the picture frame according to a look up table of digitally compressed color codes of the most visually significant color combinations of a fifth digital word size smaller than the sum of the second, third, and fourth digital word sizes; means for encoding a plurality of combinations of the run lengths and the digitally compressed color codes representing at least a portion of the picture frame; means for comparing the run lengths and digitally compressed color codes of the current picture frame with the run lengths and digitally compressed color codes of a previous picture frame to determine changes from the previous picture frame to the current picture frame; means for encoding the changes from the previous picture frame to the current picture frame; means for transmitting the coded changes of run lengths and compressed color codes; means for receiving the transmitted encoded changes in run lengths and the compressed color codes; means for decoding the digitally compressed color component codes according to the look up table to form a table of the three digital color components for each run length; means for storing the run length and corresponding color components in an array in a buffer memory means of run length and color component data representing the scan lines in the video picture frame; and means for generating a color video display signal representing the run length and associated color components data on a pixel by pixel basis.

Other aspects and advantages of the invention will become apparent from the following detailed description and the accompanying drawings illustrating by way of example the features of the invention.

DETAILED DESCRIPTION OF THE INVENTION

Figure 1:
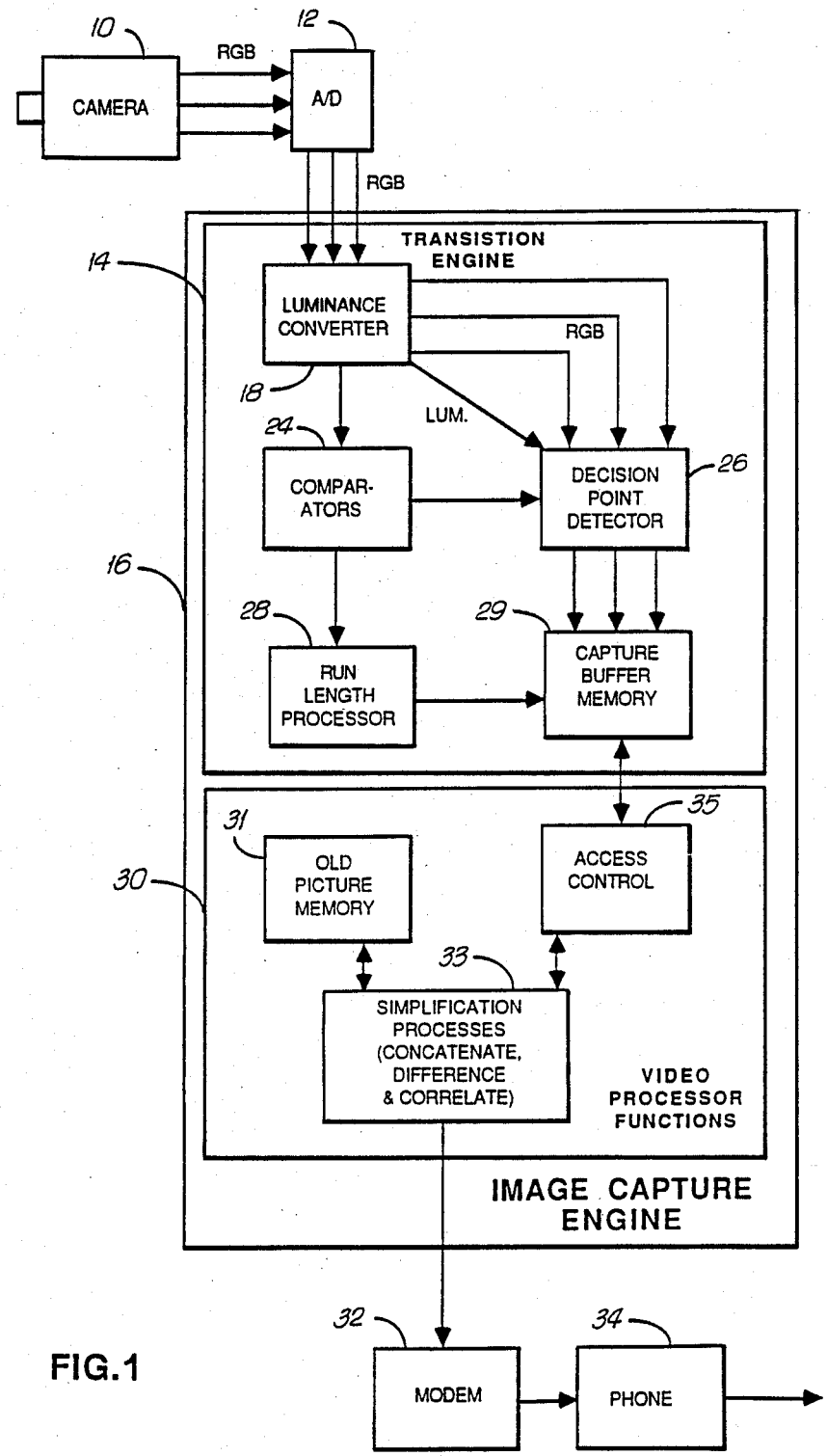
FIG. 1 is a schematic diagram of the system and method for compressing color video data in a video communication system.

As is shown in the drawings for purposes of illustration, the invention is embodied in a method and system for compressing color video data in a video telecommunication system having means for producing a color video signal for a plurality of picture frames, with each picture frame comprising a plurality of scan lines composed of a plurality of pixels. For each pixel a luminance function is determined, based upon at least one of the three digital color component signals for at least a substantial portion of the pixels in the scan lines of the picture frame, and one or more decision parameters based upon the difference of the luminance function between pixels a predetermined distance from another pixel on the scan line is determined for at least a substantial portion of the pixels in the scan lines of the picture frame. The value of change of one or more of the decision parameters for each of the pixels is determined, and is compared with corresponding adaptive threshold values to determine which of the pixels in the scan lines are loci for significant changes in the luminance function from pixel to pixel, for determining run lengths of sequentially related pixels.

A digitized color video signal is produced which has three digital color components and a run length portion, the run length portion being of a first digital word size, and the three digital color components being of second, third and fourth digital word sizes, respectively. A histogram is created of up to a predetermined number of the most frequently occurring combinations of the color components in at least a portion of the picture frame. All of the digital color components in the picture frame are encoded to a look up table of digitally compressed color codes of a fifth digital word size smaller than the sum of second, third, and fourth digital word sizes; and the plurality of run lengths are encoded in combination with the digitally compressed color codes. The representation of color with such a limited number of codes allows for a significant reduction in the bit size necessary to represent the color data; and the use of run lengths allows for a further significant reduction in the amount of data required to represent pixels in a picture.

As is shown in the drawings for purposes of illustration, the invention is also embodied in a method and system for decompressing color video data in a video information communication system utilizing a plurality of the digitized signals representing pixel run lengths and digitally compressed color component codes, and a look up table of the digitally compressed color component codes for three corresponding digital color components. The digitally compressed color codes are decoded according to the look up table to form a table of the three digital color components for each of the run lengths, and the run lengths and corresponding color components are stored in an array in a buffer memory to represent run length and color component data for the scan lines in a video picture frame.

The run length and digital color signals are mapped in a pixel generator to a display format representing the pixels in the scan lines of the video picture frame, and the color portion of the digitized signals is converted to three digital color components of appropriate digital word sizes to represent individual points in a picture.

In accordance with the invention, there is provided a method for compressing digital color video data in a video telecommunication system having means for generating a color video signal for a plurality of video picture frames, with each picture frame comprising a plurality of scan lines composed of a plurality of pixels, and each pixel in said picture frame comprising three digital color components, the method comprising the steps of determining a luminance function for each pixel based upon at least one of said three digital color components; determining at least one decision parameter for at least a substantial portion of the pixels in the scan lines of said picture frame based upon the difference of said luminance function between pixels a predetermined distance from at least one other pixel on each scan line; comparing the at least one decision parameter with a corresponding threshold value to determine starting pixels and ending pixels for run lengths of sequentially related pixels in the scan lines, the run lengths being of a first digital word size, and the three color components being of second, third, and fourth digital word sizes, respectively; encoding all of the digital color components in the picture frame according to a look up table of digitally compressed color codes of the most visually significant color combinations of a fifth digital word size smaller than the sum of the second, third and fourth digital word sizes; encoding a plurality of combination of the run lengths and digitally compressed color codes representing at least a portion of the picture frame; comparing the run lengths and digitally compressed color codes of the current picture frame with the run lengths and digitally compressed color codes of a previous picture frame to determine changes from the previous picture frame to the current frame; and encoding the changes from the previous picture frame to the current picture frame for at least a portion of the picture frames, whereby once an initial picture frame is encoded, only those changes in subsequent picture frames are encoded.

The invention further provides a system for compressing digital color video data in a video telecommunication system having means for generating a color video signal for a plurality of video picture frames, with each picture frame comprising a plurality of scan lines composed of a plurality of pixels, and each pixel in said picture frame comprising three digital color components, the system comprising means for determining a luminance function for each pixel based upon at least one of said three digital color components; means for determining at least one decision parameter for at least a substantial portion of the pixels in the scan lines of said picture frame based upon the difference of said luminance function between pixels a predetermined distance from at least one other pixel on each scan line; means for comparing at least one decision parameter with a corresponding threshold value to determine starting pixels and ending pixels for run lengths of sequentially related pixels in the scan lines, the run lengths being of a first digital word size, and the three color components being of second, third and fourth digital word sizes, respectively; means for encoding all of the digital color components in the picture frame according to a table of digitally compressed color codes of the most visually significant color combinations of a fifth digital word size smaller than the sum of the second, third and fourth digital word sizes; means for encoding a plurality of the run lengths and digitally compressed color codes representing at least a portion of the picture frame; means for comparing the run lengths and digitally compressed color codes of the current picture frame with the run lengths and digitally compressed color codes of a previous picture frame to determine changes from the previous picture frame to the current frame; and means for encoding the changes from the previous picture frame to the current picture frame for at least a portion of the picture frames, whereby once an initial picture frame is encoded, only those changes in subsequent picture frames are encoded.

The invention additionally provides a method for decompressing digital color video data in a video telecommunication system having means for receiving a plurality of digitized signals representing changes from a previous picture frame to a current picture frame of combinations of a plurality of pixel run lengths and digitally compressed color component codes of at least a portion of a plurality of scan lines of a video picture frame, the system including a look up table of digitally compressed color component codes for three corresponding digital color components, the combinations of run length and digitally compressed color component codes having a first digital word size, and the compressed color component codes having a second digital word size, comprising receiving the changes from a previous picture frame to a current picture frame of combinations of run lengths and compressed color component codes to be decompressed and decoded; decoding the digitally compressed color component codes according to the look up table to form a color components table for each of the three digital color components for each the run length, the three decoded color components having third, fourth, and fifth digital word sizes, respectively; storing the changes of the run length and the corresponding color components in an array in a buffer memory means of run length and color component data representing the plurality of scan lines in the picture frame; and generating a color video display signal comprising the tree color component data for the picture frame from the run length and associated color components for the scan lines of the picture frame for each pixel of the picture frame by mapping the pixels in the run length from a starting pixel for the run length to an end pixel of the run length to the end of the portion each scan line to be mapped.

The invention further provides for a system of decompressing color video data in a video telecommunication system having means for receiving a plurality of digitized signals representing changes from a previous picture frame to a current picture frame of combinations of a plurality of pixel run lengths and digitally compressed color component codes of at least a portion of a plurality of scan lines of a video picture frame and including a look up table of digitally compressed color component codes for three corresponding digital color components, the combinations of run length and digitally compressed color component codes having a first digital word size, and the compressed color component codes having a second digital word size, the system comprising means for receiving the changes from a previous picture frame to a current picture frame of run lengths and compressed color component codes to be decompressed and decoded; means for decoding the digitally compressed color component codes according to the look up table to form a color components table for each of the three digital color components for each the run length, the three decoded color components having third, fourth, and fifth digital word sizes, respectively; means for storing the run lengths and the corresponding color components in an array in buffer memory means of run length and color component data representing the plurality of scan lines in the picture frame; and means for generating a color video display signal comprising the three color component data from the run length and associated color components for the scan lines of the picture frame for each pixel of the picture frame by mapping the pixels in the run length from a starting pixel for the run length to an end pixel of the run length to the end of the portion of each scan line to be mapped.

The invention further provides for a method for compressing and decompressing digital color video data in a televideo communication system for transmitting and receiving a plurality of video picture frames, with each picture frame comprising a plurality of scan lines composed of a plurality of pixels, and each pixel in said picture frame comprising three digital color components, the method comprising the steps of determining a luminance function for each pixel based upon at least one of said three digital color components; determining at least one decision parameter for at least a substantial portion of the pixels in the scan lines of said picture frame based upon the difference of said luminance function between pixels a predetermined distance from at least one other pixel on each scan line; comparing the at least one decision parameter with a corresponding threshold value to determine starting pixels and ending pixels for run lengths of sequentially related pixels in the scan lines, the run lengths being of a first digital word size, and the three color components being of second, third and fourth digital word sizes, respectively; encoding all of the digital color components in the picture frame according to a look up table of digitally compressed color codes of the most visually significant color combinations of a fifth digital word size smaller than the sum of the second, third and fourth digital word sizes; encoding a plurality of combinations of the run lengths and digitally compressed color codes representing at least a portion of the picture frame; comparing the run lengths and digitally compressed color codes of the current picture frame with the run lengths and digitally compressed color codes of a previous picture frame to determine changes from the previous picture frame to the current frame; and encoding the changes from the previous picture frame to the current picture frame for at least a portion of the picture frames, whereby once an initial picture frame is encoded, only those changes in subsequent picture frames are encoded; transmitting the encoded changes from a previous picture frame to a current picture frame of the run lengths and the digitally compressed color codes; receiving the transmitted encoded changes from a previous picture frame to a current picture frame of the run lengths and compressed color codes to be decompressed and decoded; decoding the digitally compressed color component codes according to the look up table to form a color components table for each of the three digital color components for each the run length, each of the three decoded color components having sixth, seventh, and eighth digital word sizes, respectively; storing the run length and the corresponding color components in an array in a buffer memory means of run length and color component data representing the plurality of scan lines in the picture frame; and generating a color video display signal representing the three color components data from the run length and associated color components for the scan lines of the picture frame for each pixel of the picture frame by mapping the pixels in the run length from a starting pixel for the run length to an end pixel of the run length to the end of the portion each scan line to be mapped.

The invention additionally provides for a system for compressing and decompressing digital color video data in a televideo communication system for transmitting and receiving a signal for a plurality of video picture frames, with each picture frame comprising a plurality of scan lines composed of a plurality of pixels, and each pixel in said picture frame comprising three digital color components, the system comprising means for determining a luminance function for each pixel based upon at least one of said three digital color components; means for determining at least one decision parameter for at least a substantial portion of the pixels in the scan lines of said picture frame based upon the difference of said at least one luminance parameter between pixels a predetermined distance from at least one other pixel on each scan line; means for comparing the at least one decision parameter with a corresponding threshold value to determine starting pixels and ending pixels for run lengths of sequentially related pixels in the scan lines, the run lengths being of a first digital word size, and the three color components being of second, third and fourth digital word sizes, respectively, for each the run length; means for encoding all of the digital color components in the picture frame according to a look up table of digitally compressed color codes of the most visually significant color combinations of a fifth digital word size smaller than the sum of the second, third and fourth digital word sizes; means for encoding a plurality of combination of the run lengths and digitally compressed color codes representing at least a portion of the picture frame; comparing the run lengths and digitally compressed color codes of the current picture frame with the run lengths and digitally compressed color codes of a previous picture frame to determine changes from the previous picture frame to the current frame; and means for encoding the changes from the previous picture frame to the current picture frame for at least a portion of the picture frame, whereby once an initial picture frame is encoded, only those changes in subsequent picture frames are encoded; means for transmitting the encoded changes from a previous picture frame to a current picture frame of the run lengths and the digitally compressed color codes; means for receiving the encoded changes from a previous picture frame to a current picture frame of the transmitted encoded run lengths and the digitally compressed color codes to be decompressed and decoded; means for decoding the digitally compressed color component codes according to the look up table to form a color components table for each of the three digital color components for each the run length, each of the three decoded color components having sixth, seventh, and eighth digital word sizes, respectively; means for storing the run length and the corresponding color components in an array in a buffer memory means of run length and color component data representing the plurality of scan lines in the picture frame; and means for generating a color video display signal representing the three color component codes from the run length and associated color components for the scan lines of the picture frame for each pixel of the picture frame by mapping the pixels in the run length from a starting pixel for the run length to an end pixel of the run length to the end of the portion each scan line to be mapped.

As is illustrated in the drawings, in a preferred implementation of the invention, the video communication system is capable of producing a color video picture using an RGB video camera, generating an analog RGB signal at the normal 60 fields per second, with each field representing half of the picture in an interlaced mode. The signal for the video picture frames generated by the camera 10 is received by an analog to digital converter 12, which converts the red, green and blue (RGB) analog components into digital RGB components, which are each digitized as six bit digital words, forming packets of bits for the RGB components for each pixel of the color video picture of eighteen bits.

The type of the device used to generate the source color video picture is not crucial to the invention, as a camera generating a standard NTSC composite signal which is converted to an RGB digital output would also be suitable as would a field rate which differs from the standard 60 fields per second. The output of the camera also does not need to be strictly RGB, since other three color component groups may be used to create and transmit color video pictures. For example, the three digital color component signals may be cyan, magenta, and yellow; hue, saturation, and intensity; or even two distinct colors and a third parameter based upon the entire video signal, such as hue, saturation or intensity of an original analog video signal, so that there would be some automatic weighting of the color information generated by the camera.

It is also not essential that the three color components be represented by the same number of bits, since it is known in the television industry that certain ranges of colors are not as easily perceived by the human eye. Such a weighting of information could involve a reduction in the number of bits used for the red component in an RGB scheme, for example, thus permitting transmission of more gradations of other color information that is actually perceptible.

In addition, the source of the color video pictures to be compressed may be a storage means, such as a video disk, a computer file storage media, a video tape, or the like from which the color video information can be processed for introduction into the color video data compression system of the invention.

The digitized RGB signal is received by the transition engine portion 14 of the image capture engine 16, which preferably includes integrated circuit means and associated memory means. The first major part of the image capture engine is the transition engine which includes circuitry for determining a luminance function based upon the three color component video signal for each picture element, or pixel, of each scan line in the sequence of video picture frames generated by the analog front end of the system. In the preferred mode, the luminance converter 18 sums the bits from each of the three digital color components for each pixel in the scan lines of the video picture frame to get a luminance (or intensity) value and performs further processing of the data obtained. In the system of the present invention each scan line preferably contains 480 pixels, which matches the resolution of the camera and which provides for better resolution than is typically available in the prior art, in which generally only 256 pixels are utilized per scan line. The luminance of the three color components may be weighted to give greater significance to one color or two colors to provide the luminance function, and may also be based in part upon an original source analog video signal. However, the luminance function is preferably based in part at least upon the sum of the three digital color components. The luminance function derived from the sum of the three six bit color components therefore has a digital word size of eight bits. This luminance function for each pixel is utilized in the input capture engine for evaluating one or more decision parameters based upon the luminance function for determination of those pixels which operate as decision points about which the one or more of the decision parameters are found to vary from a prestored set of threshold values.

The luminance function is an excellent indicator of color changes in the picture, or movements of objects in the picture. In the image capture engine the one or more decision parameters based upon the luminance function may also be used as the basis for determination of differences from line to line, and of distinctive sequences of pixels which define edges of objects which can be determined to be moving from frame to frame. Generally, the luminance, or other combination of color components which comprise the luminance function, undergoes significant changes where there are changes in the characteristics of the picture.

The camera also introduces anomalies or artifacts into the video picture due to noise in the color sampling resolution which ideally should be eliminated to reduce the amount of data to be transmitted since they contribute nothing beneficial to the picture. When the picture is displayed with a new field every 60th of a second, the effect of such anomalies is averaged out by the human eye. Areas having a smooth appearance and little actual detail upon close observation seem to "crawl". This appearance is also known as the "mosquito effect". When a picture is frozen so that only one field or picture frame is being examined, the picture takes on a grainy, speckled appearance. The impact of the noise on the luminance data is in the form of tiny variations in the computed luminance. When the picture is digitized, the digitizing process also converts all of these artifacts to digital representations, even though they do not actually represent picture detail. The processing of luminance in the image capture engine operates to eliminate such meaningless details.

One preferred method eliminating the non-essential details caused by noise in the luminance data is to determine the points of change based at least in part on the luminance function for pixels in the scan lines by comparing differences in one or more decision parameters with corresponding adaptive thresholds. The decision parameters are preferably comprised of differences of the luminance function between pixels, determined between proximate pixels (Diff−1) in a scan line, n plus one n plus two, or even a further distance away, where n represents the position on a scan line of the pixel being examined for changes in luminance; between adjacent first differences (Diff−2), and a cumulative parameter (Cum−diff) which is a sum of the individual difference functions Diff−1, and Diff−2. Each decision parameter has its own corresponding adaptive threshold, having a default value which is subject to modification by the system in response to operator settings. The adaptive threshold preferably has a default value which may be adjusted by the input capture engine responsive to operator or processor selections for resolution. The selecting of the threshold parameters for determining either the feature or transition decision points is quite subjective. The selection of the parameters determines the number of data points required to define the picture and it also determines the overall perceptual quality of the picture.

Typically for the feature run length determination, two thresholds are used. One is the cumulative change in luminance since the last decision point, Cumdiff. Cumdiff will trigger a decision point if it was greater than 6 and the number of pixels since the last decision point was greater than 5. Another decision parameter is the sum of two adjacent difference values, Diff2 (this is the same as the difference between luminance values that are two pixels apart). If the Diff2 value is computed to be greater than typically 32, the logic will signify that the line is entering an edge, which identifies a decision point, and will stay in the edge characteristic until the Diff2 value falls below 20. When the edge mode is exited, the color of the next pixel is carried all the way back to the pixel where the starting edge determination was made. Also, if Diff2 changes sign, it signifies a new decision point. Changing the values for the cumdiff thresholds greatly affects the quality and data complexity of the picture.

In the slope determination of decision points (apexes), three general conditions are used. An initial slope is determined at the decision point and all measurements are base on that slope. The initial slope, INITS, is determined by computing the following function termed NDIFF2:

$$NDIFF2 = (luminance_{(i+2)} - luminance_{(i)})/2$$

INITS is the value of NDIFF2 immediately after the decision point.

CUMDIFF in the slope case is defined the following way:

$$CUMDIFF_{(i)} = CUMDIFF_{(i-1)} + NDIFF2_{(i)}$$

If the absolute value of the CUMDIFF is typically greater than 20 and the number of pixels in the run length is typically greater than 10, then a decision point will be triggered. Similarly, if the absolute value of NDIFF2 is less than or equal to typically 4 and the run length is typically greater than 5, a decision point will be triggered unless the last decision point was also triggered in this manner. The third decision parameter is also based upon NDIFF2:

$$TRIGVAL_{(i)} = NDIFF2_{(i)} - INITS$$

The threshold for TRIGVAL is usually set in the range of 4 to 10 and will trigger a decision point any time the absolute value reaches or exceeds the set value and the run length is at least 2 pixels. Other techniques may be used but these seem to give good quality pictures with an acceptable number of data points.

Figure 2:
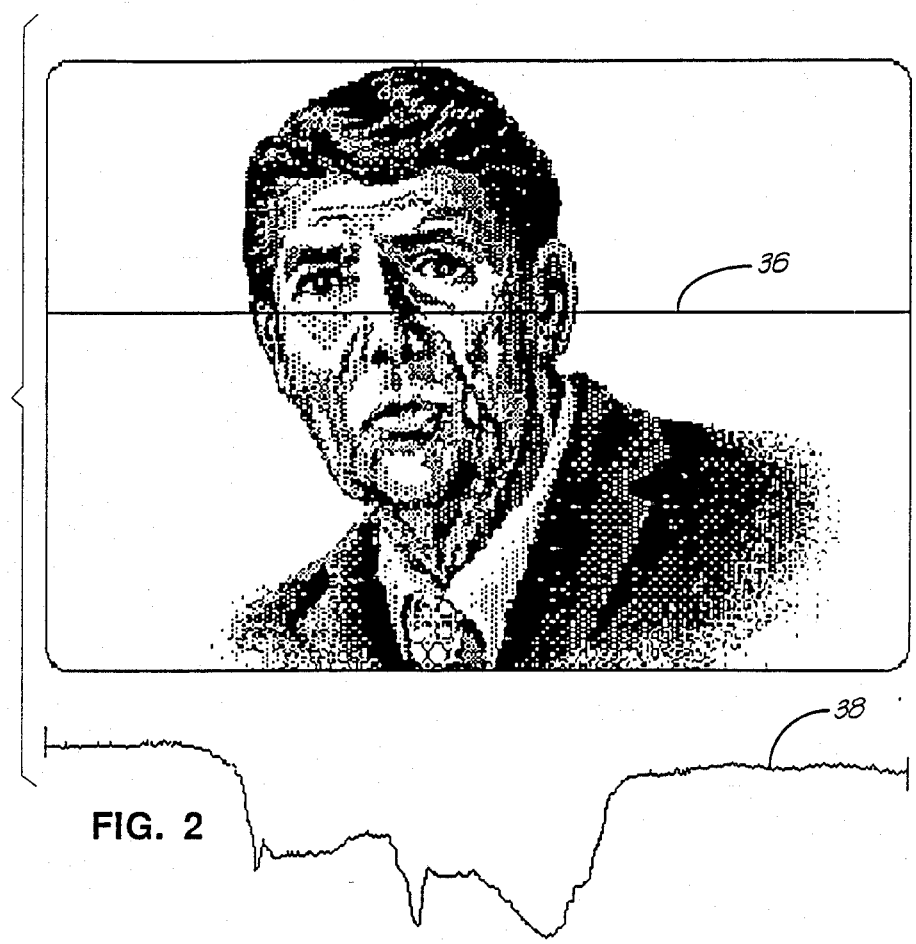
FIG. 2 is a luminance plot across one scan line in a video picture.
Figure 3:
FIG. 3 shows a run length representation of features in a video scan line.

A graphic representation of a typical plot of luminance across a line of a video picture is shown in FIG. 2. The luminance function of the pixels intersected by the scan line 36 is graphically represented by line 38. As is shown in FIG. 3, a graph of the decision points based upon comparison of on of the decision parameters with the corresponding adaptive difference threshold in a feature encoding technique, results in stepped line 40, a sequence of horizontal straight lines across the luminance pattern. Each horizontal line represents a separate length of a specific color.

Figure 4:
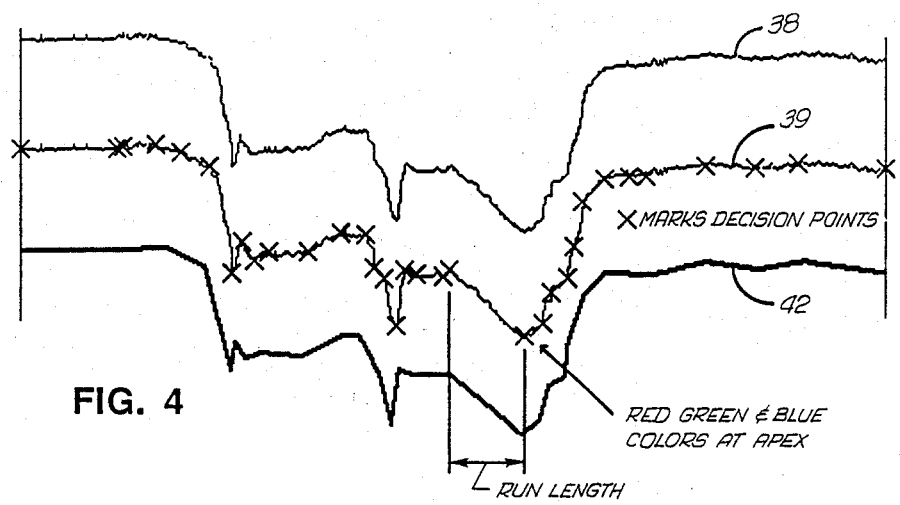
FIG. 4 shows a run length representation of transitions about slope decision points of a video scan line.
Figure 5:
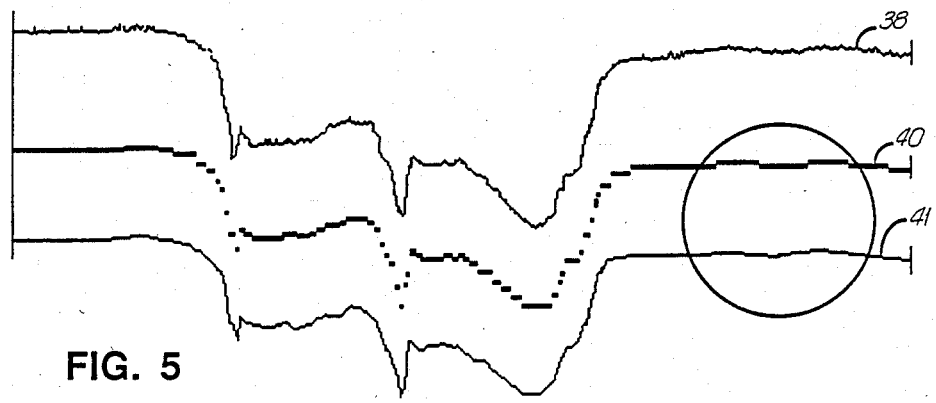
FIG. 5 shows a representation of the reconstructed video scan line for display.
Figure 6:
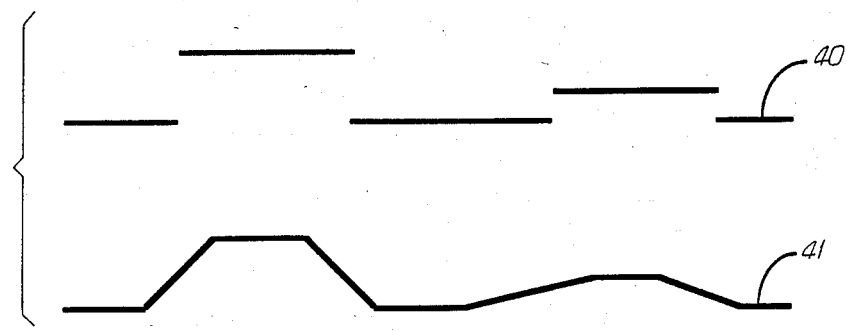
FIG. 6 shows a representation of how the run length data is converted to display data with transitions between runs.

A second approach which may be used to eliminate the non-essential details is a transition or slope encoding technique, which is illustrated in FIG. 4. In this technique the rate of change of the differences in the decision parameter between pixels is determined, and the rates of change of these differences are compared with an adaptive, prestored difference rate of change threshold to determine decision points or apex points. These change points or decision points are indicated as X's on line 39. They indicate the location of the next apex. "Run length" is defined as being the pixel distance between decision points, for both the feature encoding and slope encoding techniques. According to the transition or slope encoding technique, the luminance data results in a line 42 representing a series of apexes or slope decision points, which may be used for controlling the color segments between decision points. A drawing engine can produce a smooth transition of color values for the run length between decision points when the encoded information is to be retrieved. In this technique, for each scan line an initial color is transmitted, followed by as many sequences of run length and color values as are necessary to represent the picture frame content. In either implementation the information is displayed as a series of slopes. For the run length encoded data artificial color slopes are inserted into the display line as shown in FIG. 5. In this case the slopes are generated as a function of the luminance shift between runs and the length of the adjoining runs as shown in FIG. 6.

In the image capture engine of FIG. 1, the decision point detector 26 for determining decision points may alternatively be able to utilize either one of these methods for fixing the decision points in the color of the pixels in the picture, as each method has its respective advantages and disadvantages. The feature coding technique is typically more appropriate for pictures with a complexity of objects with distinctive edges or lines. On the other hand, the slope encoding technique is most suitable for encoding gradual transitions in shading or gradual color changes, but may require additional coding to represent complex pictures with images having many edges and lines. In the preferred implementation of the slope encoding technique, a sequence of thresholds will be compared with decision parameters, and the cumulative parameter (cum−diff) and an adaptive cumulative threshold will also be utilized in determining decision points, to account for those slow, gradual rates of change of luminance which would still result in an accumulated luminance change which is significant enough to merit identification of a decision point.

The three component color codes are also operated on in the run length processor 28 to drop the two least significant bits from the six bit values for the color components, reducing each of the color components in the preferred mode to four bit digital words. Alternatively, in one preferred embodiment, the transition engine may also contain a predetermined color map representation of three-component colors, with an n-bit code corresponding to a particular color combination. Here, the colors of the image are matched as closely as possible with the colors in the color map. As a further alternative, the color codes could also be rounded. These truncated or reduced digital color components are then encoded with the run lengths between decision points in the run length processor 28. Although the preferred bit size for the reduced color components is four bits, just as the input digital word size for the color components from the analog front end can be of different sizes to vary the informational content, the reduced digital color components may also be of different sizes. A particular combination of digital word sizes for color components may include a reduced size for the red component, due to the recognition in the industry of the reduced perceptibility of this component.

The feature and slope encoding techniques allow for a variable number of bits to be used to represent an initial picture frame and then changes in subsequent picture frames, in order to encode the minimum number of bits for each picture frame. This is significant a improvement over the prior art which typically analyzes a four by four or three by three block of pixels to compress the information in such a block, which always results in the same number of bits being utilized to represent the informational content in the picture, whether there have been changes outside the segment or not.

The second major portion of the image capture engine is the capture buffer memory (CBM) 29, which receives the encoded run lengths and reduced color components representing some 200 lines of data from the picture frame. Alternatively, if the data rate required becomes too high to send pictures at a desired speed, lesser numbers of scan lines can be stored, such as 150 or 100 lines. The run length and color component information in the capture buffer memory is then transmitted to the video data processor 30, which accesses the run length and color data in the capture buffer memory by an access control 35, and operates as an interface to transform and transmit the video information in a format suitable for transmission by the modem 32, connected to the telephone 34, and which may include means for further compressing the video data, at 33. The video data may also be compared with a previous picture frame stored in an old picture memory 31.

It is possible in a simplification processor 33 of a video data processor 30 to further analyze the difference between color values of pixels after the color codes have been truncated to provide the reduced color component codes, and to concatenate run lengths of such reduced color component codes which vary less than a given threshold value, or to further concatenate run lengths of the reduced color codes based upon variance of one or more of the decision parameters with respect to a corresponding threshold. As the run length code is typically at a maximum of four bits to be compatible with run length and color code combinations of 16 bits, with 16 bit computer buses in the current implementation, concatentation of a sequence of pixels for each run length would be expected to permit coding of up to sixteen pixels per run length. However, in the current implementation the values 0 to 15 are used to represent run lengths of from 2 to 17 pixels, since run lengths of 0 and 1 are not meaningful. Alternatively, longer run lengths may be determined initially as well, as may be compatible with different capacity computer buses, to permit run lengths of greater than 4 bits and run length color code combinations greater than 16 bits.

As mentioned previously, it is expected that the limits of compression required for adequate smoothing of information in a real time sequencing of video pictures in telecommunication would be about 15 frames per second for transmission over conventional telephone lines. It would be possible to use a modem at 1200 bits per second (bps), but this would considerably slow the number of frames per second possible in the communication system. Ideally, the system is configured for half duplex mode, and a full duplex mode of configuration would be expected to require two telephone lines. Ideally the modem that is to be used is one which would utilize the largest bandwidth possible, and may be conventional 2400 bps or 9600 bps modem or special modems providing higher rates may be used.

Although the invention has been described in the context of a video telephone conferencing system, the invention may be also be adapted for use in compressing color video data on magnetic media, such as magnetic floppy discs which may be used in storing and communicating such data via computer systems, magnetic hard disks for image storage or short video movie sequences, or on video discs for video disc players which could transmit the information in the form of a full length movie.

Figure 7:
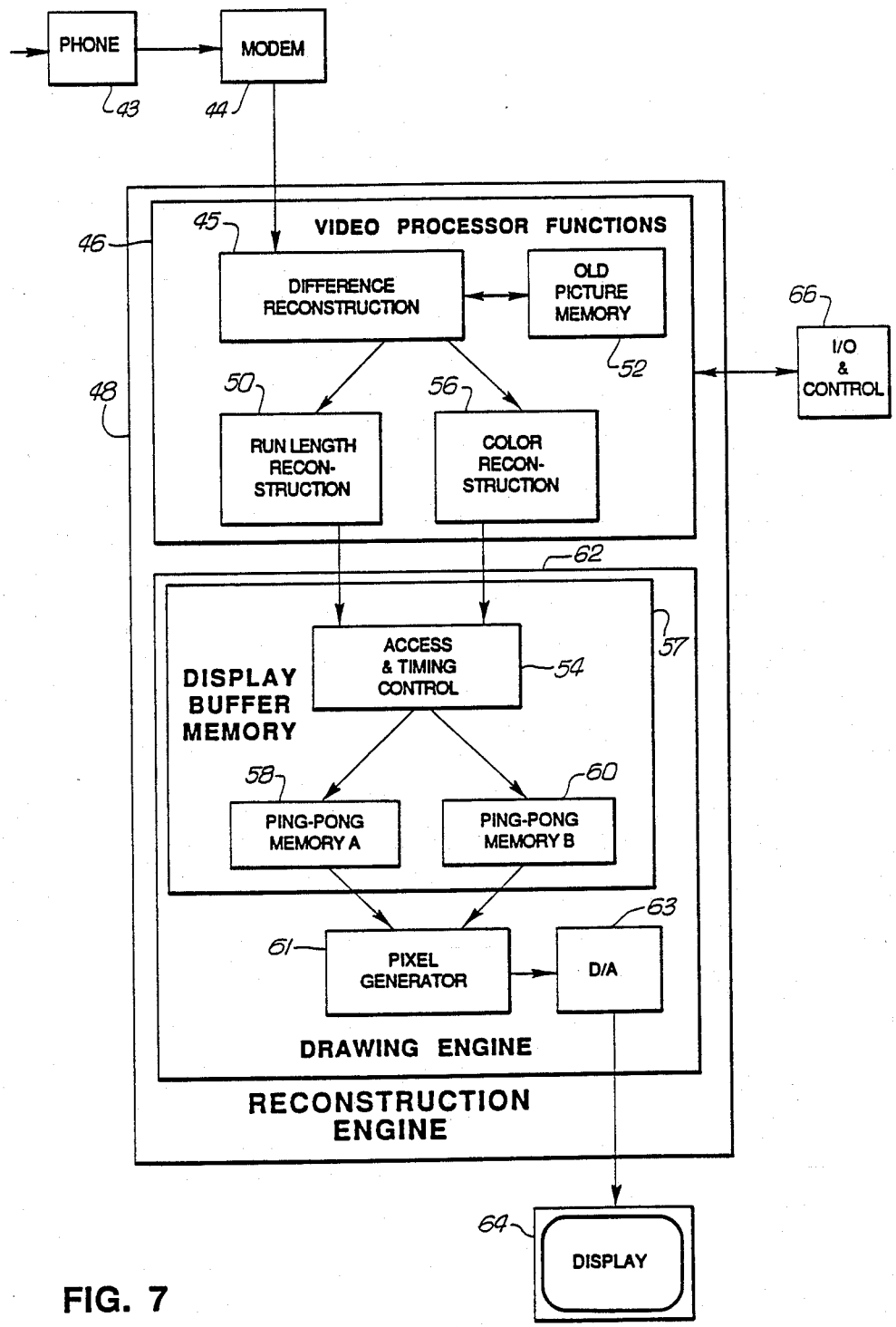
FIG. 7 is a schematic diagram of a method and system for decompressing color video data in a video communication system.

With reference to FIG. 7, in the preferred embodiment, a telephone 43 receives a transmitted signal from a transmitter modem over ordinary telephone lines and the receiver modem 44 converts these signals to an electronically digitized format to be receivable by video data processor 46. The video data processor then adapts the digitized signals which represent encoded run length and color information to a format which is acceptable for reception by the drawing engine 62. The drawing engine of the reconstruction engine 48 converts the run length data to slope form and presents it pixel by pixel to the digital to analog converter for use by the monitor. Alternatively, the video processor interface could be adapted to receive the compressed color video data from a computer system 66 retrieving the information from magnetic media, such as a hard disc or high capacity floppy discs, or from a video disc player for displaying a much greater length series of video picture frames, in a form such as for a video movie. The video data processor preferably includes microprocessor means and associated memory means (not shown) programmed to carry out various functions. A preferred function is to reconstruct a total picture frame data representation in terms of run length and color codes from an old picture memory 52 of the last picture frame data, and an array of the run lengths and color codes which have changed from the last picture frame. This difference reconstruction function 45 prepares picture frame data for run length reconstruction at 50 and color code reconstruction 56, utilizing control signals embedded in the run length and color data.

As the run length and color information are received by the video data processor 46 of the reconstruction engine 48, the digitized signals are typically of a digital word size of sixteen bits. The number may vary, depending upon the type of statistical encoding used. Alternatively a color code (which may be from 4 to 8 bits in length) may be used to select specific colors from a map or pallet so that fewer bits need to be sent. As compressed and encoded from an input construction engine as described earlier, the digital word size of the run length portion actually processed would typically be four bits, and the digital word size of the color code portion would be twelve bits. As mentioned previously, the preferred apportioning of bit sizes of the three color component codes is such that each digital color code component is of a digital word size of four bits. However, only small portions of the picture which have actually changed may be actually encoded, with appropriate control data for skipping run lengths which may not have changed being embedded in the transmitted information. The run length reconstruction or decoder function 50 of the video data processor operates to separate the run length portion from the digitized signal, and the color code reconstruction function 56 of the video data processor, for decoding the color codes, can separate the digital color components from the incoming digitized signals. However, advanced signal processing and compression of the data may also involve the concatenation of run lengths to a digital word size of eight or nine bits, so that the run length decoder function would then also operate to separate the eight or nine bit digital word size into four bit digital word portions. In the event that the run length codes were concatenated to an eight or nine bit digital word size, the color code portion would have also have been subjected to advanced data compression techniques to reduce the three digital color codes each of four bits to a combined color code portion having a digital word size of eight bits. The color reconstruction function 56 would then also operate to convert the eight bit digital color codes to three digital color codes of the four bit digital word size.

From the reconstruction engine run length decoder and color codes sections the run length and color code information is transferred from the video data processor via the access and timing control circuitry 54 in the drawing engine 62 to a drawing engine display buffer memory 57 which ideally comprises dual memory buffers, pingpong A 58 and pingpong B 60. The access and timing control 54, under the direction of the video processor, sends the reconstructed run length and color information for storing in one of the ping pong buffer memory portions until the information for an individual picture frame is complete; that picture is then displayed while the next sequential picture information received by the system is sent and stored in a similar fashion in the second portion of the display buffer memory. Each block of the display buffer memory needs to be of a sufficient capacity to avoid overflow of the memory by the run length and color code information, and it has been found that a random access memory of a capacity of 32K 16 bit digital words is adequate for the picture reconstruction.

The drawing engine 62 includes a pixel generator 61 for converting the run length and color codes stored in the individual pingpong memories to individual points for display on a monitor 64. The access and timing control 54 of the drawing engine is responsible for all display timing and control for the pixel generator. The drawing engine generates a write strobe to write the runs of color information to the series of points to be converted from digital to analog for display.

In the preferred embodiment for pixel generation from feature encoded run length data, each end of a run length of a particular color combination is essentially tapered to provide a smooth color transition from one run length to another. The resulting smoothed reconstructed video line 41 is depicted in FIG. 6. When a run length is short, it usually is an indication that the color level is changing rapidly. If the run length is long, it usually indicates the color level is changing slowly. When the change in the luminance function, given by one of the decision parameters, is large, it usually indicates a high probability of an edge in a picture, whereas if the change is small, it is probably an indication of a shading effect. Based upon the run lengths and one or more decision parameters, the pixel generator determines where intermediate decision points should be placed, and interpolates smooth color transitions for each of the RGB color components from one intermediate decision point to the next. The ends of each scan line similarly transition when they contact another color, so that the beginning and ending of a scan line may have a single intermediate decision point adjacent the end, to define a relatively sharp transition from the edge of the picture to the adjacent color. The interpolation is preferably performed linearly, but may also alternatively be shaped to more faithfully depict curved surfaces. If the image is slope encoded, the pixel generates a smooth transition from one apex to the next without injecting an intermediate decision point.

The pixel generator of the drawing engine includes all the necessary functional sections to implement the color interpolation between pairs of points designated by the run lengths, and preferably converts the four bit color components to either six or eight bit digital words, for six or eight bit precision, in three separate channels, with one for each of the RGB components. Increasing the bit size allows the pixel generator to generate smoother gradations of color transitions between pixels of different colors. For example, although four bit digital word sizes permit up to 4,096 color combinations of red, green and blue components, only up to 16 gradations of any one of the color components would be possible. Increasing the bit size up to 6 allows for up to 64 gradations of any individual component, and up to 262,144 total combinations. An eight bit digital word size permits an even greater range of gradations for an individual component. However, as discussed previously, the full digital word sizes for the color components need not be equal, and may be in fact arranged so as to allow a broader range of colors for one or two of the color components, at the expense of one of the color components which would only require a smaller digital word size to accommodate its perceptibility. The pixel generator therefore dynamically generates a complete digital representation of the pixels of a picture frame to be displayed on a pixel-by-pixel basis, and this information is transmitted on RGB three channels from the pixel generator to the digital to analog converter 63 which converts the video signal to analog form for displaying on the monitor 64.

Figure 8:
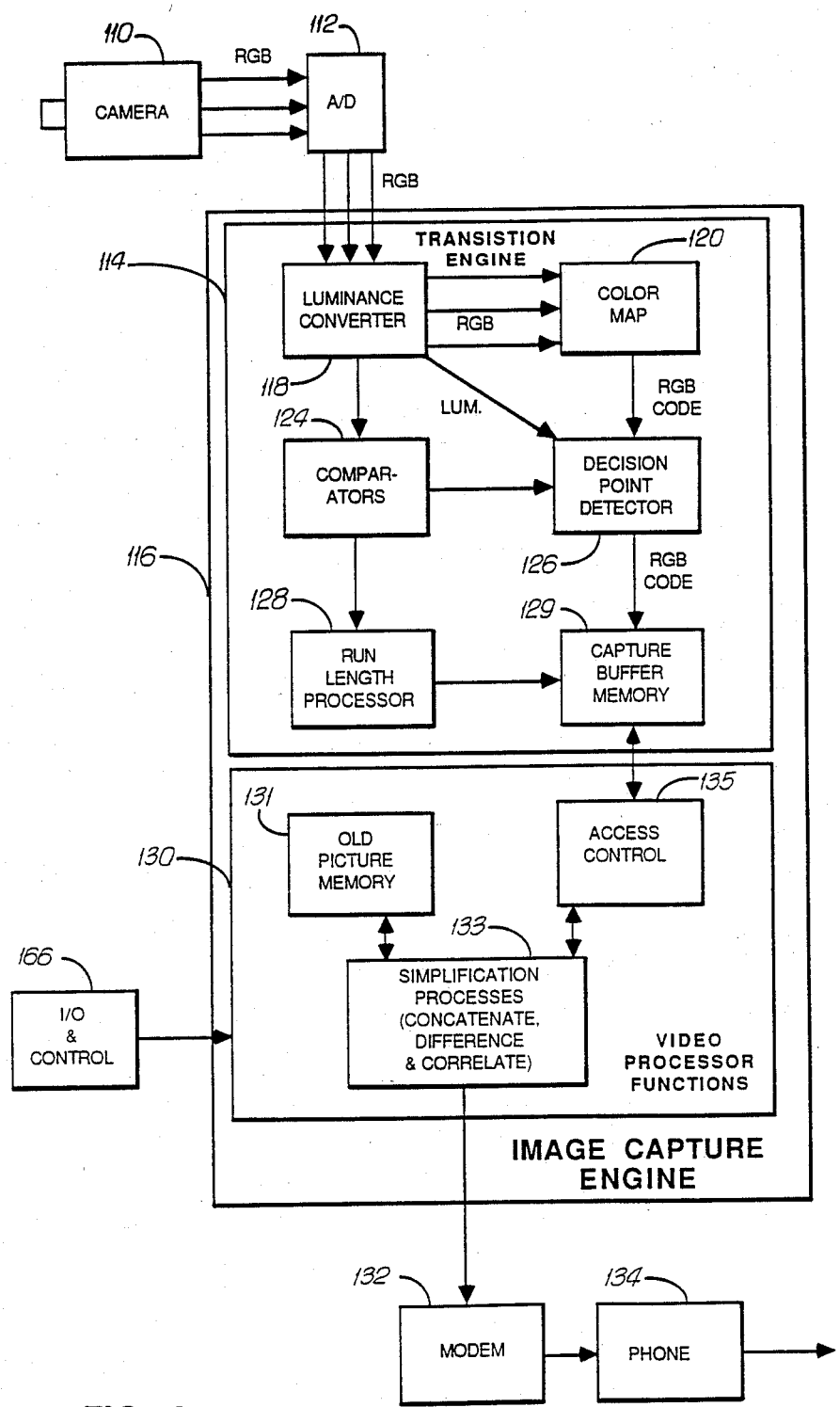
FIG. 8 shows the system and method for compressing color video data in a video communication system including an additional processor subsystem.

Referring to FIGS. 1-9, elements bearing reference numerals 110 to 134 correspond to elements bearing reference numerals 10 to 34. FIG. 8 shows another embodiment with image capture engine 116 having a video processor 130 functioning to further simplify and compress data from the transition engine 114. The output from capture buffer memory 129 is received by the processor subsystem 130 having standard input and output and control 166. The standard I/O 166 typically might include a keyboard, diskette control, a date and time clock, and a monitor output and control. Output from the processor subsystem is typically connected to a modem 132, which is in turn connected to a telephone 134 for transmission of the compressed information over ordinary telephone lines. More than one modem may be used to provide faster image display rates or higher quality color images.

Figure 9:
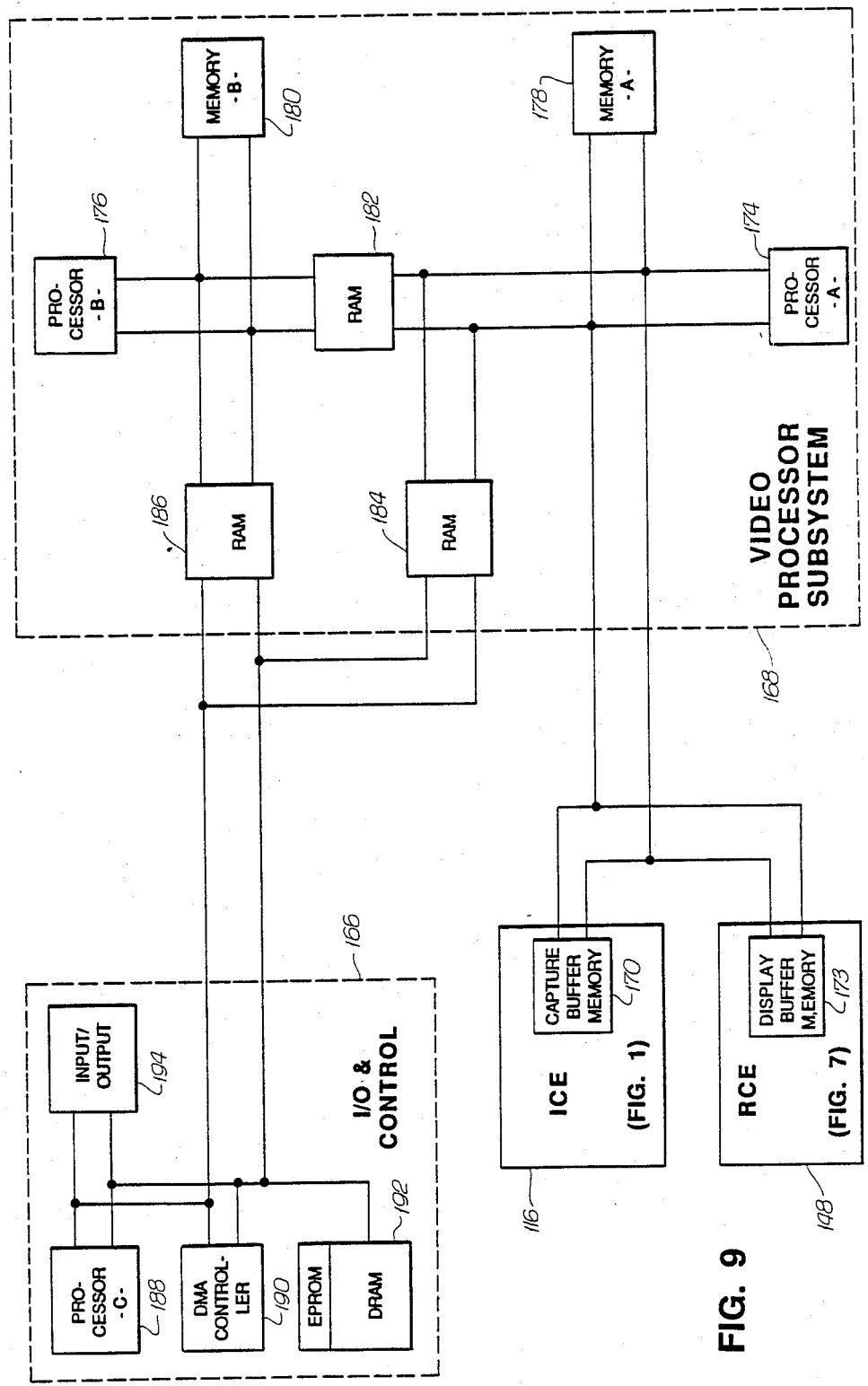
FIG. 9 is a more detailed schematic diagram of a combined I/O control section, processor section, and input construction engine and reconstruction engine.

With reference to FIG. 9, the video data processor subsystem 168, which performs the compressing and decompressing functions of the video processor 130 and the video processor 146, to be explained further hereinafter, is most preferably adapted to be connected to both an image capture engine (I.C.E.) and a reconstruction engine (R.C.E.) for use in compressing and decompressing video color data in a two-way communication system. However, where the processor subsystem is being used for compressing the color video information, it should be apparent that the reconstruction engine need not be connected to the same processor subsystem as is connected to the image capture engine. If a video communication system is configured so that the image capture system circuitry is part of a camera, and the reconstruction engine circuitry is part of a display monitor, different processor subsystems 130 and 146 would generally be utilized by the image capture engine and the reconstruction engine.

As is illustrated in FIG. 9, the shared video data processor subsystem receives input from shared capture memory buffer 170 for receiving input from the image capture engine, and preferably also sends output to a shared display memory buffer 172 which contains section 154, 158 and 160 of the drawing engine, for output to the reconstruction engine. Each of these memory buffers requires sufficient capacity to avoid overflow the encoded information, and it has been found in practice that a memory space of 32K by 16 bits is adequate for these purposes. Memory buffer 170 is also preferably shared for input and output between the image capture engine and the video data processor; and the memory buffer 172 with its dual pingpong memory section is similarly shared for input and output between the reconstruction engine and the video data processor. The processor subsystem includes two microprocessors, which are preferably Motorola 68020 32 bit processors, processor "A" 174, and processor "B" 176. As processor "A" typically performs most of the processing functions of the processor subsystem, it is provided with a private data memory "A" 178 of 512K bytes. Processor "B" is provided with a lesser amount of memory in memory "B" 180 of 256K bytes. Also provided between processor "A" and processor "B" for communication between the processors is a dual port ram 182 of 16K bytes. Dual port RAMS 184 and 186 of 32K bytes are also provided as buffers between processors "A" and "B" and the I/O processor section 166.

The microprocessor "C" 188 for the I/O control section 166 is preferably an Intel 80286 having DRAM refresh and a direct memory access 190 for diskette control and a DRAM 192 of 512K bytes. Input/output ports 194 are designated generally for the standard I/O, which may include disk drives, keyboard, a monitor, and the like.

Figure 10:
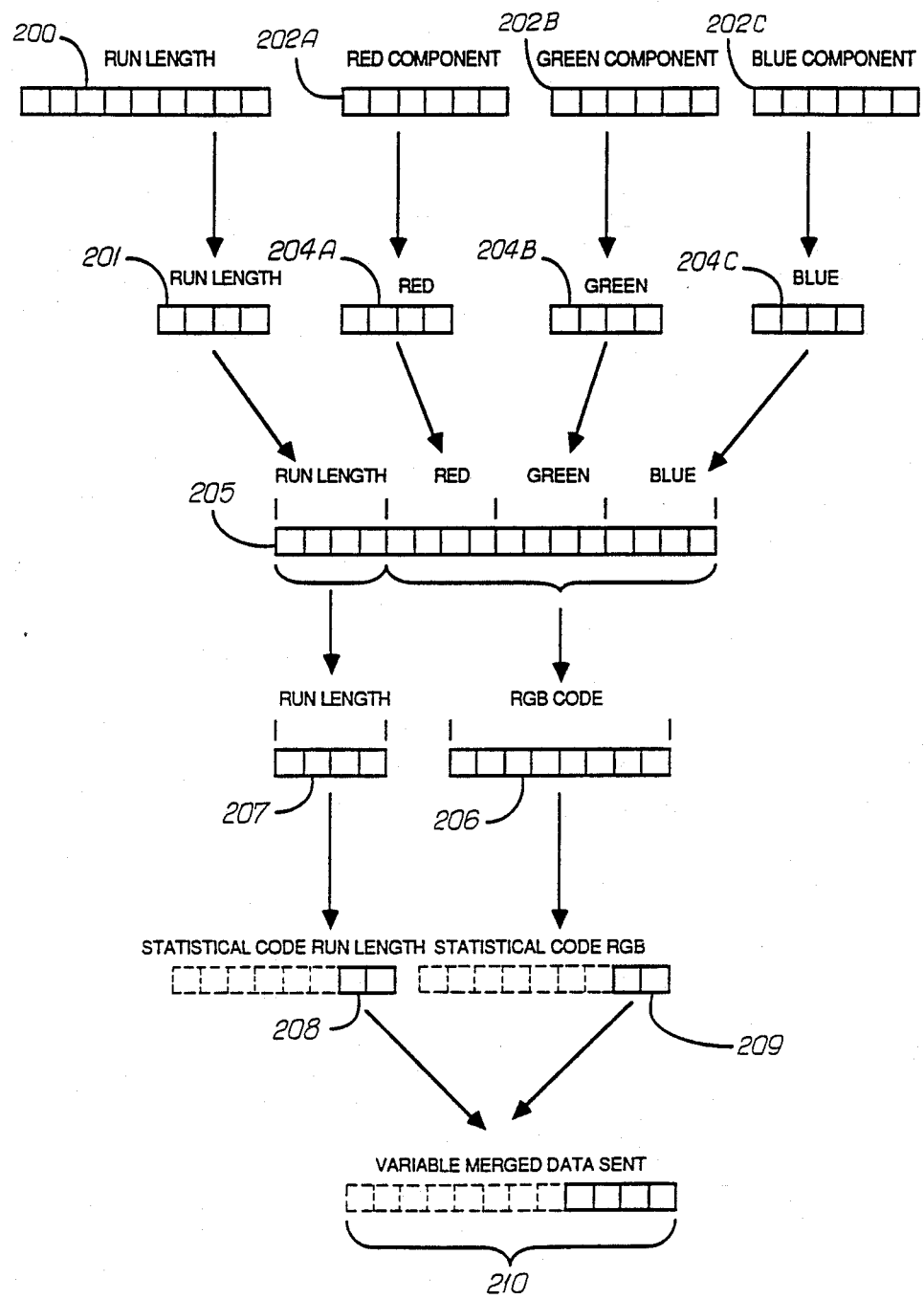
FIG. 10 is a flow diagram illustrating the compression of digital word sizes of run length and color components.
Figure 11:
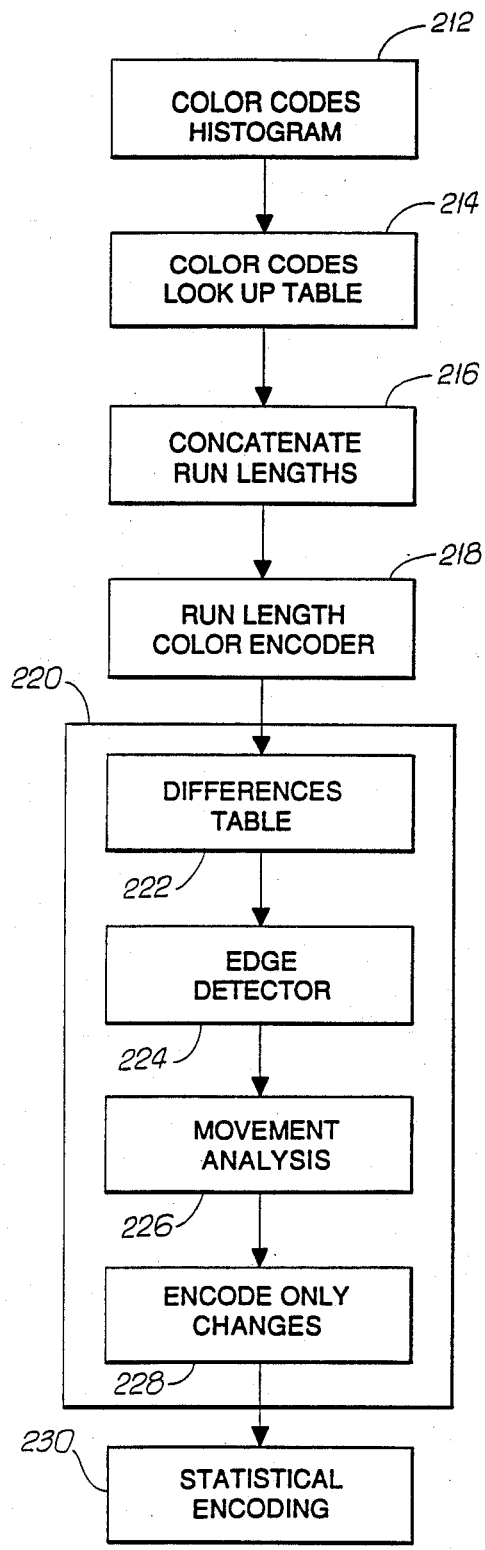
FIG. 11 is a flow chart illustrating the additional signal processing of color video data.

With reference to FIGS. 8, 10 and 11, the operation of the image capture engine and the processor subsystem 130 having simplifying and compressing functions will be described. The run lengths 200 of a sequence of pixels in a scan line having like color values are determined as nine bit digital words which are divided in the image capture engine as four bit digital words 201. The RGB color components 202a, b, c as utilized for determining the luminance functions in section 118 are six bit digital words used for determining decision points for run lengths in the decision point logic 126. These colors are truncated by removing the two least significant bits from each six bit word in the color code truncation circuitry or rounding it 120 to form four bit digital words 204a, b, c. The run length encoder 128 maps a series of run length and RGB color code combinations 205 to the capture buffer memory 129, in preparation for the further processing of the processor subsystem 130. In the preferred embodiment of this invention, a predetermined default color map 214, in the color code section 120 consisting of a look up table of unique combinations of the three color components such as RGB values and corresponding eight bit codes, maps 256 of the most visually significant color combinations out of a possible 4,096, obtained from the three RGB truncated four bit codes. The color map is preferably alterable by the video data processor subsystem.

The 256 color code combinations to be included in the color map are determined on the following basis. Given that each RGB color component is represented as a four bit code, a range of 16 gradations of each color component is possible. However, in practice the colors at the extremes of each range of gradations rarely appear in images captured by a video camera. Statistical surveys of a wide variety of scenes captured by video cameras reveal a common distribution of colors. To illustrate the distribution, a two-dimensional chart of a range of from 0 to 16 of green downward along a vertical axis, with a range of from 0 to 16 of blue to the right across a horizontal axis yields an oval shaped pattern in the middle, along an axis from 0,0 to 15,15. Adding a third dimension of red yields an sausage-shaped distribution of the most visually significant color combinations from a wide variety of possible scenes and images. A combination selected from an extremity of this sausage-shaped distribution has been found to be virtually indistinguishable from a color combination at a nearby extremity of the three-dimensional color block, and within the sausage-shaped distribution, color combinations proximal to each other are also virtually indistinguishable. By careful selection of 256 representative color combinations from blocks within this sausage-shaped distribution, a color map can thus be constructed of the most visually significant color combinations likely to be encountered. In practice it has been found that an RGB ratio of 4:3:2 produces colors in the skin tone ranges, and this information can be used to balance the color ratio distribution, with the primary factor being subjective appearance.

Figure 15:
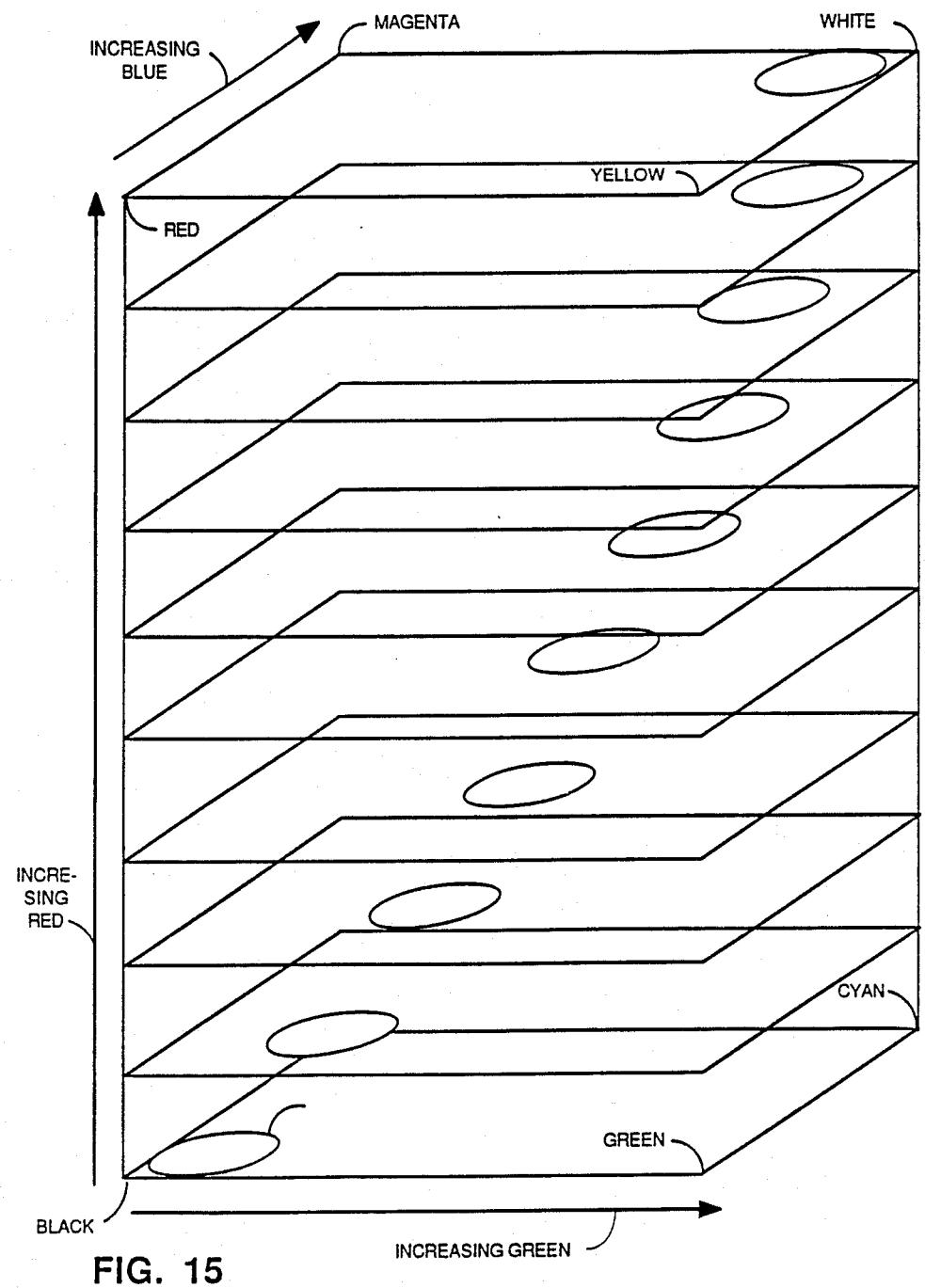
FIG. 15 is an illustration of a three-dimensional color cube.

The color mapping process makes use of the observation that most colors that occur in nature are not very pure. FIG. 15 shows a color cube with no color, black, in the front lower left corner and white which is the maximum red, green and blue in the upper right back corner. Green increases to the right from the black, all zeros, origin. Blue increases from the black toward the lower left back corner and red is represented by a number of planes representing constant levels of red. The red increases in the direction of the top of the cube. Thus all of the possible colors may be represented in the cube to a precision which is dependent on the number of bits allocated to each color component. Any specific color may be represented by the coordinates of any point within the cube.

All of the real colors seem to be heavily bunched along a sausage shape which runs from the black corner in an upward arc to the white corner. Since the colors are concentrated with no natural colors occurring in the pure red, green, blue, magenta, cyan or yellow corners, it is possible to reduce the number of color codes form the 4096 possible prepresented by 4 bits each of red, green and blue. The ovals represented by 260, identify the areas which must be reproduced with some precision because the real colors concentrate here.

It is really only necessary to have flesh tones be faithful reproductions with slight off-colors in other areas being quite acceptable since the persons on the receiving end do not know exactly what colors were present in the transmitting end of the system although a correction process may be applied if it is important. The approach for generating the color map has been to define fine gradations in color in the flesh tones with more coarse gradations the further the captured color is away from the central "sausage". The map was empirically derived from examining the color distributions in a large number of pictures and adjusting the map parameters to get acceptable results. The correction process consists of analyzing the actual colors which occur in each of the map areas and correcting the map segment so that it more faithfully represents the detected colors in that scene. The process is quite subjective but seems to work well.

In the processor subsystem, a histogram of the RGB color codes 212 is statistically processed for all of the run length combinations to update the color map 214 to be used as a look up table. Even with the four bit color codes for each of the RGB components, up to 4,096 different color combinations would be theoretically achievable. In practice, it has been found that a group of carefully selected 256 color combinations is quite adequate to serve as apex colors for the drawing engine to construct the image with up to 262,144 colors with six bit color reconstruction of each of the three color components. Alternatively further gradiations are possible by reconstructing each of the three color components as eight bit codes. Therefore, the histogram of 256 of the most frequent RGB color combinations may be used to modify the colors encoded as a series of eight bit digital words in the color code look up table or color map 214. Since each other combination in the color map represents a block of ranges of colors, the color frequency histogram may be used to substitute a more frequently occurring color combination within its color block as a representative color combination, for more faithful color reproduction. As these representative substituted colors are determined by the system are visually significant, and are not merely selected upon frequency of appearance in the picture.

The RGB color information requirement for 12 bits to represent the maximum of 4,096 colors is thus reduced to a table of 256 8 bit digital words to represent the 256 most visually significant colors. Less frequently occurring colors which may be over the limit of 256 colors may also forced to conform to the same coloration as the nearest color code combination in the color map, without significant lessening of the accuracy of the colors in the picture frame to be transmitted. Once the color codes are in the form of eight bit digital words 206 which may be combined with the four bit run length portion 200, the four bit run length code, which actually represents a run length of from 2 to 17 pixels in the preferred implementation of the encoding of run lengths, can be statistically processed to provide a varying length digital word 208 to be assembled in the eventual fully processed run length color code combination 210. The run length codes may vary from one bit for most frequent lengths up to 8 or 10 for rarely occurring lengths. Thus, the run length may represent from 2 to 257 pixels, which would be theoretically adequate to represent an entire scan line of 512 pixels in two run length color code combinations. Thus, the four bit run lengths are concatenated where possible at 216 finally before encoding the run length and color code combinations at 218. In order to accommodate the encoding of the eight bit RGB color components in the run length combinations, it is also necessary to construct and encode the color code look up table 214 as a table of 256 individual four bit color codes for each of the RGB components, which would be transmitted with the color code run length combinations to enable a receiver or translator of the picture information to decode compressed color information.

More advanced processing and compression of the run length color code combinations may also occur in the advanced processing section 220. Similar to the pixel to pixel differencing and comparison for determination of decision points in the input construction engine, adjacent scan lines may be compared to formulate a table of scan lines which do not differ from the previous scan line in the direction of scanning, so that the lines or portions of lines may be merely duplicated. Thus, this would allow further compression of the run length and color code combinations 210 as a differences table 222. Another technique termed subframe processing may be used to reduce the amount of data which must be sent to update a new picture on the receiving section of a system. This subframe processing technique samples every nth line and continues processing only with those lines for any one image. Distinctive segments of run length combinations which appear to form an edge may be detected in an edge detector 224 to monitor the displacement of such segments from frame-to-frame by movement analysis 226, which preferably could track the movement of such scan line segments in groups of scan line segments according to any horizontal shifting, shrinking, growing, or vertical displacement of such segments, or virtually any combination of such movements. A further level of compression involves the frame-to-frame differencing by comparison of the run length and color codes combination information from the last picture frame with the current picture frame, and encoding of a skip code to identify those portions which have not changed, so that only the run length and color code combinations which have changed are encoded at 228.

Finally, the processor subsystem also preferably encodes the run length and color code combinations to be transmitted from the processor subsystem by determining a histogram of the occurrence of run length and color code combinations. The preferred form of statistical encoding at this stage is similar to Huffman coding, and involves the assignment of the most frequently occurring combination to a table of one bit digital words, at 230. This table is to be utilized at the receiving end of the system by referring to one or the other of the bit states of the one bit digital word to fill in this most frequently occurring run length combination in a corresponding run length color code table. For example, if the table indicates a binary one, the receiving table would be filled in with the run length color code combination, and would otherwise be left with a marker of zero indicating that the spot in the table was to be filled in later. The next three most occurring combination are then represented as a two bit length digital word, with one of the binary bit states again indicating that the receiving table location was to be filled in later, and the next three most frequently occurring combinations are filled in their respective locations in the corresponding receiving table. A three bit digital word table can then be constructed in a similar fashion to designate the next seven most frequently occurring values, with one of the binary bit states representing values to be filled in later, and so on, with a final digital word size of eight bits used to represent the remaining color code combinations. This process may be applied to other groupings than the 1, 2, 3, n bit grouping sequences described above. Most preferably, this statistical encoding of the compressed run length color code information is performed for at least the color codes, individually, with the run length portions then being encoded and received as a separate table of eight bit digital words, but it is also possible to separately statistically encode the eight bit run length portions in a similar fashion and transmit a separate statistically encoded table for the run length components of the run length-color code combinations. Other similar statistical encoding approaches may also be appropriate as an alternative.

Figure 12:
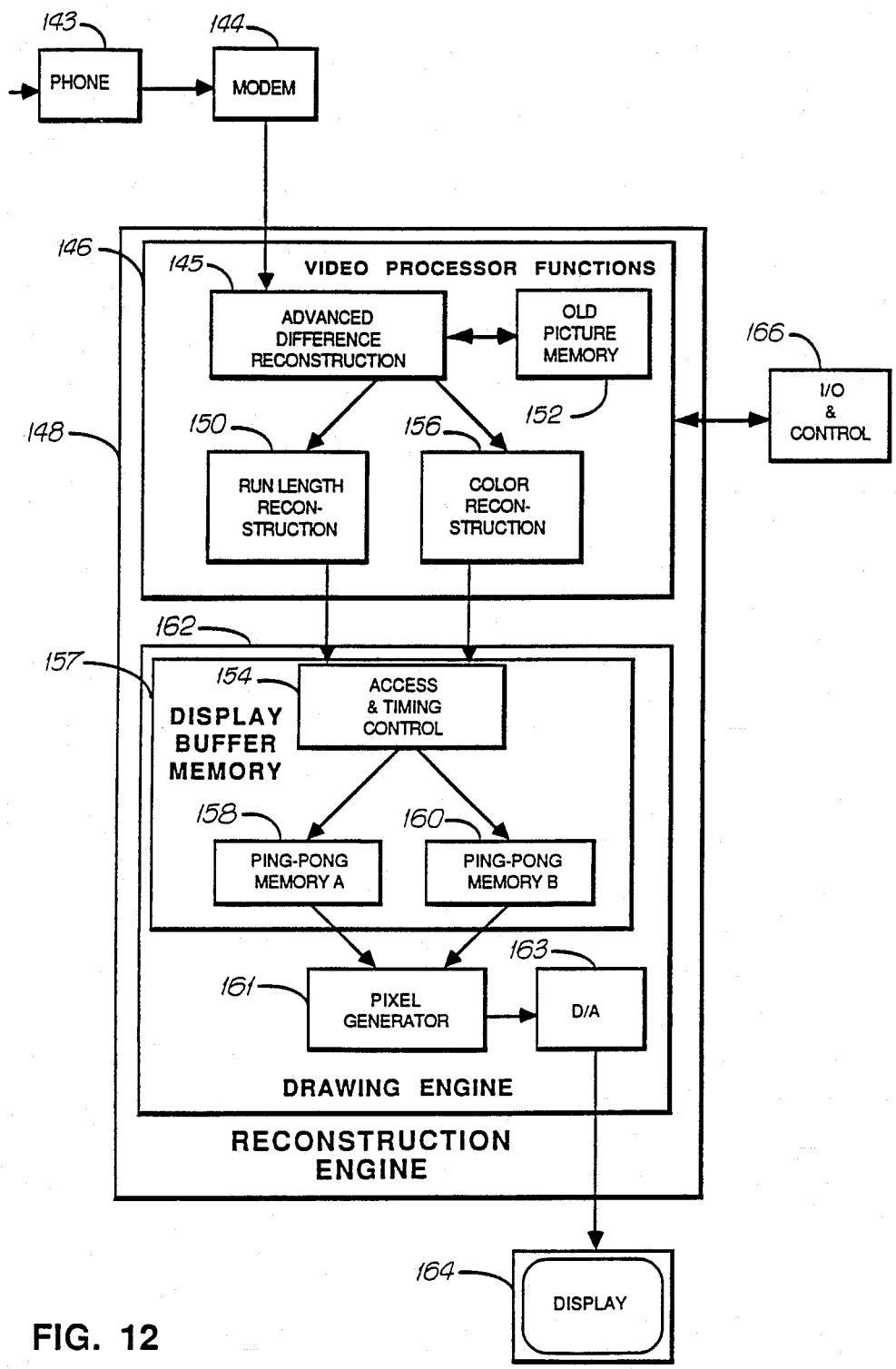
FIG. 12 shows the system and method for decompressing the color video data in a video communication system including an additional processor subsystem.

Referring to FIG. 12, in which elements 143 to 166 are essentially identical to those previously described which bear reference numerals 43 to 66, in the preferred mode of the invention the telephone 143 receives the audio digitized signals from the transmitter modem over ordinary telephone lines, which is in turn received by the receiving modem 144, and the video data processor 146, which prepares the digitized video signal in a form and format adapted to the receivable by the drawing engine 162. The video data processor 146 is connected to the input/output and control section 166. The architecture of the processor subsystem is generally as has been described and illustrated in FIG. 9. The digitized signal representing combinations of a plurality of run lengths of a first digital word size and digitally compressed color component code of at least a portion of a plurality of scan lines of a video picture frame, and a look up table of the digitally compressed color component codes, are subjected to decoding of the color component codes according to the look up table to form a table of the three digital color component in the memory of the processor color reconstruction at 156, and the run length and color components are sent to the display buffer memory 157, which includes the dual memory space 172, the access timing and control 154 and the two pingpong buffers 158 and 160.

As with the signal processed by the reconstruction engine discussed with reference to FIG. 7, the run length decoder 150 receives the decompressed run length information, and the color component information, for decoding of the run length information, is reconstructed in 156. The color and length information are compared with the prior picture 152 for mapping at 150 and 156 to the display buffer memory 157 which comprises the ping-pong memory "A" 158 and the ping-pong memory "B" 160. The pixel generator 161 is slaved by the display buffer memory 157 from the ping-pong memories alternately, to reconstruct the scan lines of the transmitted picture pixel by pixel, which is then converted from digital form to analog form in the digital to analog converter 163, for display on the monitor 164.

Figure 13:
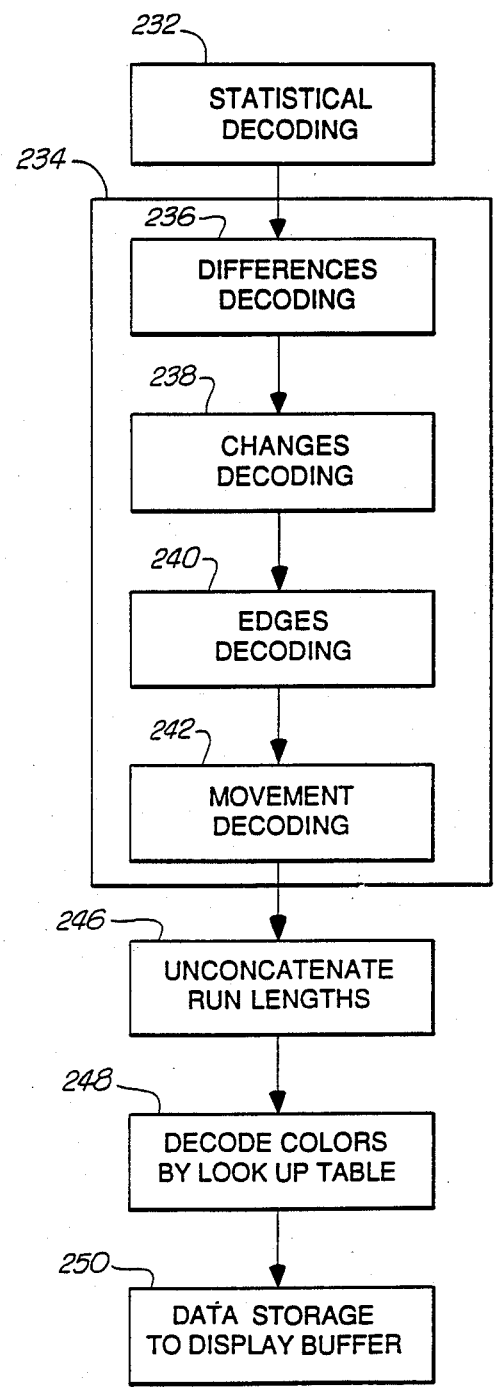
FIG. 13 is a flow diagram of the decoding of the additional data compression processing from FIG. 11.
Figure 14:
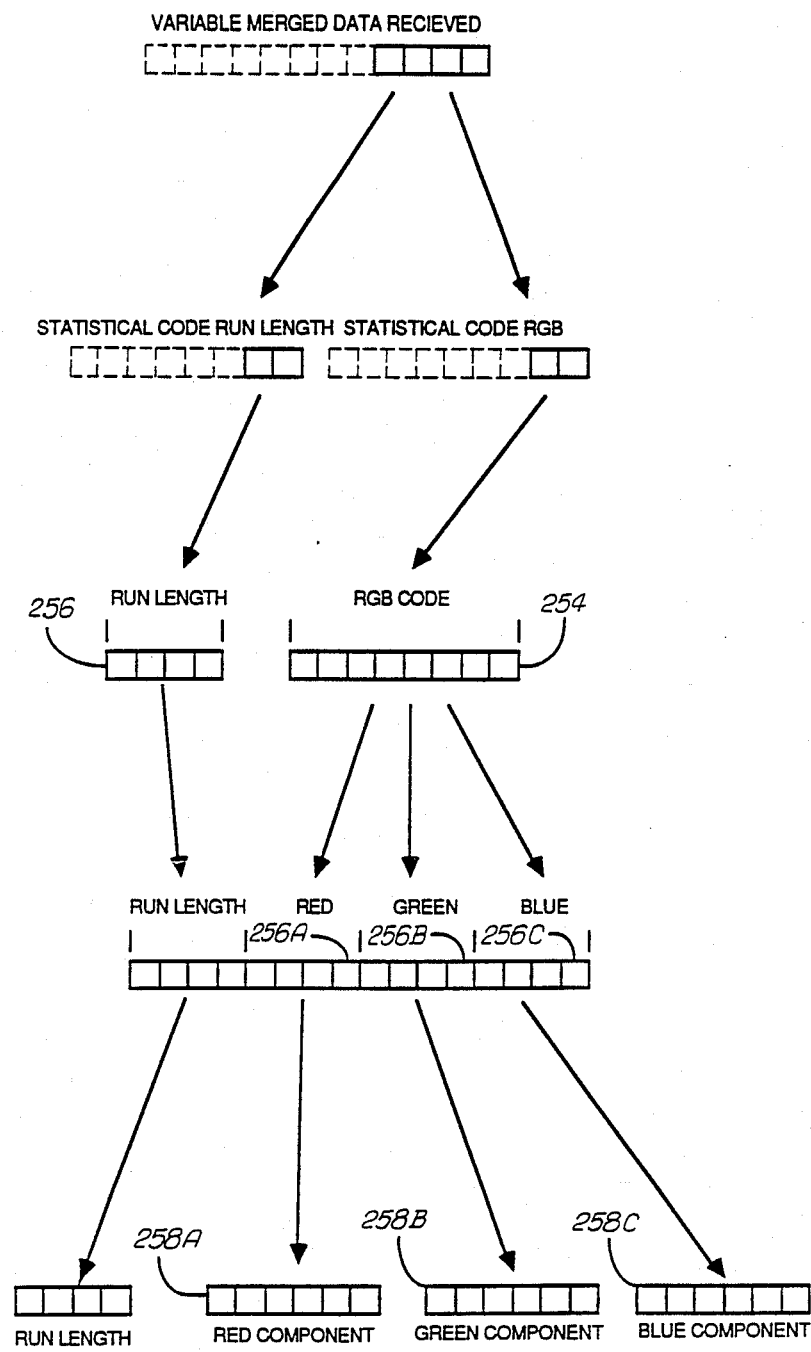
FIG. 14 is a flow diagram illustrating the decompression of the processed digital words of run length and color components of FIG. 10.

With reference to FIGS. 13 and 14, in the preferred embodiment of the processor subsystem 146 of the invention, prior to the difference reconstruction at 145 occurring in video data processor, the statistical coding is decoded at 232 and possibly also at 234 by formation of a table in the memory of the processor subsystem of the run length and associate color codes, to be filled in at 156 according to the look up table, as explained previously. In the advanced difference reconstruction operations 145, the frame-to-frame differences and line-to-line differences tables are decoded at 234 for decoding the differences from frame-to-frame at 236 or changes from line-to-line at 238, with reference to the old picture memory 152. Also in the difference reconstruction operation, the tables representing the edges and movement are decoded at 240 and 242, with the picture information between the edges being constructed by interpolation. The division at 246 of run lengths of the concatenated digital word size to run lengths of a four bit digital word size occurs in the run length reconstruction operation 150. The decoding of the compressed color codes in the color reconstruction operation 156, according to the look up table, occurs at 248, allowing the four bit, six bit, or eight bit color component codes to be assigned to the run lengths, for storage at 250 in the display buffer memory 157.

Thus, referring to FIG. 14, in the statistical decoding of the fully compressed digitized signal, the tables reconstructed are of the four bit digital word size run length 256, and the eight bit digital word size RGB compressed color code 254. The run length-color decoder treats the run length portion separately to provide the four bit digital word size run length portions 256; and the eight bit digital word size RGB compressed color codes are decoded to provide the individual four bit digital word size RGB components 256a, 256b, and 256c. The four bit run length and four bit digital RGB color codes are mapped to the buffer memory, for processing by the reconstruction engine, and transmission to the pixel generator, where the four bit digital color components are expressed as an interpolation of six bit digital RGB components 258a, 258b, and 258c, for individual pixels between start and stop points representing the run length.

Although the invention has been described in the context of a video telephone conferencing system, the invention may be also be adapted for use in decompressing color video data from magnetic media, such as hard disks or three and a half inch high capacity magnetic floppy discs which may be used in storing and communicating such data via computer systems, or from video discs for video disc players which could transmit the information in the form of a video movie.

In the foregoing description, it has been demonstrated that the method and system of the invention permit the encoding, transmission, and retrieval of color video data by the truncation of least significant information from the color component codes, and the statistical encoding of the most visually significant color code combinations. The invention also provides for further processing of the color video data by further compression of the data by encoding concatenated run lengths, line-to-line differences, movement of segments of picture frames and portions of picture frames which have changed to reduce the amount of information to be encoded to the minimum amount. The invention further provides for additional compression of the color video data by a form of statistical encoding, which permits a further reduction of the amount of information which must be transmitted by the system.

Although one specific embodiment of the invention has been described and illustrated, it is clear that it is susceptible to numerous modifications and embodiments within the ability of those skilled in the art and without the exercise of the inventive facility Thus, it should be understood that various changes in form, detail and application of the present invention may be made without departing from the spirit and scope of this invention.

I claim:

1. A method for compressing digital color video data in a video telecommunication system having means for generating a color video signal for a plurality of video picture frames, with each picture frame comprising a plurality of scan lines composed of a plurality of pixels, and each pixel in said picture frame comprising three digital color components, said method comprising the steps of:
   (a) determining a luminance function for each pixel based upon at least one of said three digital color components;
   (b) determining at least one decision parameter for at least a substantial portion of the pixels in the scan lines of a current picture frame based upon the difference of said luminance function between pixels a predetermined distance from at least one other pixel on each scan line;
   (c) comparing said at least one decision parameter with a corresponding threshold value to determine starting pixels and ending pixels for run lengths of sequentially related pixels in said scan lines, said run lengths being of a first digital word size, and said three color components being of second, third, and fourth digital word sizes, respectively;
   (d) encoding all of said digital color components in said picture frame according to a look up table of digitally compressed color codes of the most visually significant color combinations of a fifth digital word size smaller than the sum of said second, third and fourth digital word sizes;
   (e) encoding a plurality of combination of said run lengths and digitally compressed color codes representing at least a portion of said picture frame;
   (f) comparing said run lengths and digitally compressed color codes of said current picture frame with the run lengths and digitally compressed color codes of a previous picture frame to determine changes from said previous picture frame to said current frame; and
   (g) encoding said changes from said previous picture frame to said current picture frame for at least a portion of said picture frames, whereby once an initial picture frame is encoded, only those changes in subsequent picture frames are encoded.

2. The method of claim 1, wherein said step of comparing said at least one decision parameter with a threshold value comprises determining the rate of change of said differences for each of said pixels for which said luminance function difference has been determined; and comparing said rates of change of differences with a predetermined adaptive difference rate of change threshold to determine which of said pixels represent points of change of said luminance function.

3. The method of claim 1, wherein said step of comparing said at least one decision parameter with a threshold value comprises comparing a plurality of decision parameters with a corresponding plurality of thresholds to determine which of said pixels represent points of change of said luminance function.

4. The method of claim 1, wherein said three digital color components represent red, green and blue color video components, and said first, second, and third digital word sizes are equal.

5. The method of claim 1, wherein each said combination of run length and color components is coded as at least a sixteen bit digital word.

6. The method of claim 1, further including the step of concatenating run lengths in said plurality of combinations of run lengths and color components for combinations having color components whose differences are less than a predetermined color difference threshold.

7. The method of claim 1, further including the step of encoding a table of run lengths and compressed color codes representing only those differences from one scan line to the next adjacent scan line in a picture frame in one direction, for each picture frame.

8. The method of claim 1, wherein said step of encoding changes from one picture frame to the next picture frame includes determining distinctive edges of an image segment that has moved as at least one sequence of combinations of run length and compressed color codes in at least one scan line for each picture frame, and encoding in said table of changes the changes in at least one of said sequences between distinctive edges as a table representing a movement of said image sequence from one frame to another frame sequentially.

9. The method of claim 8, wherein said movement encoded is selected from the group consisting of horizontal shifting, shrinking, growing, vertical displacement, horizontal shifting and shrinking, horizontal shifting and growing, horizontal shifting and vertical displacement, vertical displacement and shrinking, and vertical displacement and growing.

10. The method of claim 1, wherein the step of determining said luminance function comprises summing said three digital component signals.

11. The method of claim 10, wherein said luminance function has a digital word size of eight bits.

12. The method of claim 10, wherein the step of determining said luminance function includes weighting of the sum of said three digital color component signals with respect to one of said three digital color component signals.

13. The method of claim 1, wherein the digital word size of each of said digital color components from which said luminance parameter is determined is six bits.

14. The method of claim 13, wherein the digital word size of said color components is reduced to four bits in said combinations of run lengths and color components.

15. The method of claim 14, wherein each said combination of run length and color components is coded as at least a sixteen bit digital word.

16. A system for compressing digital color video data in a video telecommunication system having means for generating a color video signal for a plurality of video picture frames, with each picture frame comprising a plurality of scan lines composed of a plurality of pixels, and each pixel in said picture frame comprising three digital color components, said system comprising:
   (a) means for determining a luminance function for each pixel based upon at least one of said three digital color components;
   (b) means for determining at least one decision parameter for at least a substantial portion of the pixels in the scan lines of said picture frame based on the difference of said luminance function between pixels a predetermined distance from at least one other pixel on each scan line;
   (c) means for comparing said at least one decision parameter with a corresponding threshold value to determine starting pixels and ending pixels for run lengths of sequentially related pixels in said scan lines, said run lengths being of a first digital word size, and said three color components being of second, third and fourth digital word sizes, respectively;
   (d) means for encoding all of said digital color components in said picture frame according to a table of digitally compressed color codes of the most visually significant color combinations of a fifth digital word size smaller than the sum of said second, third and fourth digital word sizes;

(e) means for encoding a plurality of said run lengths and digitally compressed color codes representing at least a portion of said picture frame;

(f) means for comparing said run lengths and digitally compressed color codes of said current picture frame with the run lengths and digitally compressed color codes of a previous picture frame to determine changes from said previous picture frame to said current frame; and (g) means for encoding said changes from said previous picture frame to said current picture frame for at least a portion of said picture frames, whereby once an initial picture frame is encoded, only those changes in subsequent picture frames are encoded.

17. The system of claim 16, wherein said means for comparing said at least one decision parameter with a threshold value comprises means for determining the rate of change of said differences for each of said pixels for which said luminance function difference has been determined; and means for comparing said rates of change of differences with at least one predetermined difference rate of change threshold to determine which of said pixels represent points of change of said luminance parameter.

18. The system of claim 16, wherein said means for comparing said at least one decision parameter with a threshold comprises means for comparing a plurality of said decision parameters with a corresponding plurality of thresholds to determine which of said pixels represent points of change of said luminance function.

19. The system of claim 16, wherein said three digital color components represent red, green, and blue color video components, and said first, second, and third digital word sizes are equal.

20. The system of claim 16, wherein each said combination of run length and color components is coded as at least a sixteen bit digital word.

21. The system of claim 16, further including means for concatenating run lengths in said plurality of combinations of run lengths and color components for combinations having color components whose differences are less than a predetermined color difference threshold.

22. The system of claim 16, further including means for encoding a table of run lengths and compressed color codes representing only those differences from on scan line to the next adjacent scan line in a picture frame in one direction, for each picture frame.

23. The system of claim 16, wherein said means for encoding changes from one picture frame to the next picture frame includes means for determining distinctive edges of an image segment that has moved as a sequence of combinations of run length and compressed color codes in at least one scan line for each picture frame, and means for encoding in said table of changes the changes in at least one of said sequences between distinctive edges as a table representing a movement of said image segment from one frame to another frame sequentially.

24. The system of claim 23, wherein said movement encoded is selected from the group consisting of horizontal shifting, shrinking, growing, vertical displacement, horizontal shifting and shrinking, horizontal shifting and growing, horizontal shifting and vertical displacement, vertical displacement and shrinking, and vertical displacement and growing.

25. The system of claim 16, wherein said means for determining said luminance function comprises means for summing said three digital component signals.

26. The system of claim 25, wherein said luminance function has a digital word size of eight bits.

27. The system of claim 25, wherein said means for determining said luminance function includes means for weighting of the sum of said three digital color component signals with respect to one of said three digital color component signals.

28. The system of claim 16, wherein the digital word size of each of said digital color components from which said luminance function is determined is six bits.

29. The system of claim 28, including means for reducing the digital word size of said color components to four bits in said combinations of run lengths and color components.

30. The system of claim 29, wherein each said combination of run length and color components is coded as at least a sixteen bit digital word.

31. A method for decompressing digital color video data in a video telecommunication system having means for receiving a plurality of digitized signals representing changes from a previous picture frame to a current picture frame of combinations of a plurality of pixel run lengths and digitally compressed color component codes of at least a portion of a plurality of scan lines of a video picture frame, and said system including a look up table of digitally compressed color component codes for three corresponding digital color components, said combinations of run length and digitally compressed color component codes having a first digital word size, and said compressed color component codes having a second digital word size, comprising:

(a) receiving said changes from a previous picture frame to a current picture frame of combinations of run lengths and compressed color component codes to be decompressed and decoded;

(b) decoding said digitally compressed color component codes according to said look up table to form a color components table for each of said three digital color components for each said run length, said three decoded color components having third, fourth, and fifth digital word sizes, respectively;

(c) storing said changes of said run length and said corresponding color components in an array in a buffer memory means of run length and color component data representing said plurality of scan lines in said picture frame; and (d) generating a color video display signal comprising said three color component data for said picture frame from said run length and associated color components for the scan lines of said picture frame for each pixel of said picture frame by mapping the pixels in said run length from a starting pixel for said run length to an end pixel of said run length to the end of the portion each scan line to be mapped.

32. The method of claim 31, wherein said generating of a color video display signal from said run length and associated color components comprises mapping said starting pixel for a run length according to the associated color component, and mapping the remaining pixels in said run length by interpolating a smooth color transition to the starting pixel of the next run length to the end of the portion of each said scan line to be mapped.

33. The method of claim 31, further including the step of dividing said run length and color component combinations into a plurality of unconcatenated run length and digital color component combinations having a run length portion of an eighth digital word size, for each run length and color component combination having a run length value greater than said eighth digital word size.

34. The method of claim 31, wherein said combinations of run length and color component codes have been encoded as a table of values representing only those differences from one scan line to the next adjacent scan line in a picture frame in one direction, for each picture frame, further including the steps of decoding said table of run lengths and digitally compressed color codes, and mapping only those changes from one scan line to the next adjacent scan line in a picture frame in said direction in said array.

35. The method of claim 31, further comprising displaying said reconstructed picture.

36. The method of claim 31, wherein said step of storing said run length associated color components in a buffer memory means comprises alternately storing said run length and color components in a first buffer memory until a first set of data for said picture frame is complete and sequentially mapping said run length and associated color components of a next set of picture frame data to a second buffer memory until said next picture frame is complete, and repeating said steps of storing in said first and second buffer memories for subsequent picture frame data.

37. The method of claim 36, further comprising sequentially displaying picture frames from said first buffer memory and said second buffer memory as each picture frame in each said buffer memory is completed.

38. The method of claim 31, wherein distinctive edges of an image segment that has moved, determined as a sequence of combinations of run length and compressed color codes in at least one scan line, have been included in a table for each picture frame representing changes in said sequences as representing movement of said image segment from one frame to another frame sequentially, and further including the step of mapping said changes in said sequences of combinations of run lengths and compressed color codes to said array.

39. The method of claim 38, wherein said encoded movement is selected from the group consisting of horizontal shifting, shrinking, growing, vertical displacement, horizontal shifting and shrinking, horizontal shifting and growing, horizontal shifting and vertical displacement, vertical and displacement and shrinking, and vertical displacement and growing.

40. A system of decompressing color video data in a video telecommunication system having means for receiving a plurality of digitized signals representing changes from a previous picture frame to a current picture frame of combinations of a plurality of pixel run lengths and digitally compressed color component codes of at least a portion of a plurality of scan lines of a video picture frame and including a look up table of digitally compressed color component codes for three corresponding digital color components, said combinations of run length and digitally compressed color component codes having a first digital word size, and said compressed color component codes having a second digital word size, said system comprising:

(a) means for receiving said changes from a previous picture frame to a current picture frame of run lengths and compressed color component codes to be decompressed and decoded;

(b) means for decoding said digitally compressed color component codes according to said look up table to form a color components table for each of said three digital color components for each said run length, said three decoded color components having third, fourth, and fifth digital word sizes, respectively;

(c) means for storing said run lengths and said corresponding color components in an array in buffer memory means of run length and color component data representing said plurality of scan lines in said picture frame; and (d) means for generating a color video display signal comprising said three color component data from said run length and associated color components for the scan lines of said picture frame for each pixel of said picture frame by mapping the pixels in said run length from a starting pixel for said run length to an end pixel of said run length to the end of the portion of each scan line to be mapped.

41. The system of claim 40, wherein said means for generating a color video display signal from said run length and associated color components comprises means for mapping said starting pixel for a run length according to the associated color component, and means for mapping the remaining pixels in said run length by interpolating a smooth color transition to the starting pixel of the next run length to the end of the portion of each said scan line to be mapped.

42. The system of claim 40, further including means for dividing said run length and color component combinations into a plurality of unconcatenated run length and digital color component combinations having a run length portion of an eighth digital word size, for each run length and color component combination having a run length value greater than said eighth digital word size.

43. The system of claim 40, wherein said combinations of run length and color component codes have been encoded as a table of values representing only those differences from one scan line to the next adjacent scan line in a picture frame in one direction, for each picture frame, further including means for decoding said table of run lengths and digitally compressed color codes, and means for mapping only those changes from one scan line to the next adjacent scan line in a picture frame in said direction in said array.

44. The system of claim 40, further comprising means for displaying said picture.

45. The system of claim 40, wherein said means for storing said run lengths and associated color components in a buffer memory means comprises means for alternately storing said run length and color components in a first buffer memory until a first set of said picture frame data is complete and sequentially mapping said run length and associated color components of a next set of picture frame data to a second buffer memory until said next picture frame is complete, and repeating said steps of storing in said first and second buffer memories for subsequent picture frame data.

46. The system of claim 45, further comprising means for sequentially displaying picture frames from said first buffer memory and said second buffer memory as each picture frame in each said buffer memory is completed.

47. The system of claim 40, wherein distinctive edges of an image segment that has moved has been determined as a sequence of combinations of run length and compressed color codes in at least one scan line have been included in a table for each picture frame representing changes in said sequences as representing movement of said sequences from one frame to another frame sequentially, and further including means for storing said changes in said sequences of combinations of run lengths and compressed color codes in said array.

48. The system of claim 47, wherein said encoded movement is selected from the group consisting of horizontal shifting, shrinking, growing, vertical displacement, horizontal shifting and shrinking, horizontal shifting and growing, horizontal shifting and vertical displacement, vertical and displacement and shrinking, and vertical displacement and growing.

49. A method for compressing and decompressing digital color video data in a televideo communication system for transmitting and receiving a plurality of video picture frames, with each picture frame comprising a plurality of scan lines composed of a plurality of pixels, and each pixel in said picture frame comprising three digital color components, said method comprising the steps of:
(a) determining a luminance function for each pixel based upon at least one of said three digital color components;
(b) determining at least one decision parameter for at least a substantial portion of the pixels in the scan lines of said picture frame based upon the difference of said luminance function between pixels a predetermined distance from at least one other pixel on each scan line;
(c) comparing said at least one decision parameter a corresponding threshold value to determine starting pixels and ending pixels for run lengths of sequentially related pixels in said scan lines, said run lengths being of a first digital word size, and said three color components being of second, third and fourth digital word sizes, respectively;
(d) encoding all of said digital color components in said picture frame according to a look up table of digitally compressed color codes of the most visually significant color combinations of a fifth digital word size smaller than the sum of said second, third and fourth digital word sizes;
(e) encoding a plurality of combinations of said run lengths and digitally compressed color coded representing at least a portion of said picture frame;
(f) comparing said run lengths and digitally compressed color codes of said current picture frame with the run lengths and digitally compressed color codes of a previous picture frame to determine changes from said previous picture frame to said current frame; and
(g) encoding said changes from said previous picture frame to said current picture frame for at least a portion of said picture frames, whereby once an initial picture frame is encoded, only those changes in subsequent picture frames are encoded;
(h) transmitting said encoded changes from a previous picture frame to a current picture frame of said run lengths and said digitally compressed color codes;
(i) receiving said transmitted encoded changes from a previous picture frame to a current picture frame of said run lengths and compressed color codes to be decompressed and decoded;
(j) decoding said digitally compressed color component codes according to said look up table to form a color components table for each of said three digital color components for each said run length, each of said three decoded color components having sixth, seventh, and eighth digital word sizes, respectively;
(k) storing said run length and said corresponding color components in an array in a buffer memory means of run length and color component data representing said plurality of scan lines in said picture frame; and
(l) generating a color video display signal representing said three color components data from said run length and associated color components for the scan lines of said picture frame for each pixel of said picture frame by mapping the pixels in said run length from a starting pixel for said run length to an end pixel of said run length to the end of the portion each scan line to be mapped.

50. The method of claim 49, wherein said step of comparing said at least one decision parameter with a threshold value comprises determining the rate of change of said at least one decision parameter for each of said pixels for which said luminance function differences have been determined; and comparing said rates of change with at lease one predetermined adaptive difference rate of change threshold to determine which of said pixels represent points of change of said luminance function.

51. The method of claim 49, wherein said step of comparing said at least one decision parameter with a threshold value comprises comparing a plurality of said decision parameters with a corresponding plurality of thresholds to determine which of said pixels represent points of change of said luminance function.

52. The method of claim 49, wherein said three digital color components represent red, green, and blue color video components, and said first, second, and third digital word sizes are equal.

53. The method of claim 49, wherein each said combination of run length and color components is coded as at least a sixteen bit digital word.

54. The method of claim 49, further including the step of concatenating run lengths in said plurality of combinations of run lengths and color components for combinations having color components whose differences are less than a predetermined color difference threshold.

55. The method of claim 49, further including the step of encoding a table of run lengths and compressed color codes representing only those differences from one scan line to the next adjacent scan line is a picture frame in one direction, for each picture frame.

56. The method of claim 49, wherein said generating of a color video display signal from said run length and associated color components comprises mapping said starting pixel for a run length according to the associated color component, and mapping the remaining pixels in said run length by interpolating a smooth color transition to the starting pixel of the next run length to the end of the portion of each said scan line to be mapped.

57. The method of claim 49, further including the step of dividing said run length and color component combinations into a plurality of unconcatenated run length and digital color component combinations having a run length portion of a ninth digital word size, for each run length and color component combination having a run length value greater than said ninth digital word size.

58. The method of claim 49, wherein said combinations of run length and color component codes have been encoded as a table of values representing only those differences from one scan line to the next adjacent scan line in a picture frame in one direction, for each picture frame, further including the steps of decoding said table of run lengths and digitally compressed color codes, and storing only those changes from one scan line to the next adjacent scan line in a picture frame in said direction in said array.

59. The method of claim 49, wherein distinctive edges of an image segment that has moved, that has been determined as a sequence of combinations of run length and compressed color codes in at least one scan line, have been included in a table for each picture frame representing changes in said sequences as movement of said image segment from one frame to another frame sequentially, and further including the step of storing said changes in said sequences of combinations of run lengths and compressed color codes in said array.

60. The method of claim 49, further comprising displaying said reconstructed picture.

61. The method of claim 49, wherein said step of encoding changes from one picture frame to the next picture frame includes determining distinctive edges of an image segment that has moved as a sequence of combinations of run length and compressed color codes in at least one scan line for each picture frame, and encoding in said table of changes the changes in at least one of said sequences between distinctive edges as a table representing a movement of said image segment from one frame to another frame sequentially.

62. The method of claim 61, wherein said movement encoded is selected from the group consisting of horizontal shifting, shrinking, growing, vertical displacement, horizontal shifting and shrinking, horizontal shifting and growing, horizontal shifting and vertical displacement, vertical displacement and shrinking, and vertical displacement and growing.

63. The method of claim 49, wherein said step of storing said run lengths and associated color components to a buffer memory means comprises alternately storing said run length and color components to a first buffer memory until a first set of said picture frame data is complete and sequentially storing said run length and associated color components of a next set of picture frame data to a second buffer memory until said next set of picture frame is complete, and repeating said steps of storing in said first and second buffer memories for subsequent picture frames.

64. The method of claim 63, further comprising sequentially displaying picture frames from said first buffer memory and said second buffer memory as each picture frame in each said buffer memory is completed.

65. The method of claim 49 wherein the step of determining at least one luminance function comprises summing said three digital component signals.

66. The method of claim 65, wherein said luminance function has a digital word size of eight bits.

67. The method of claim 65, wherein the step of determining said luminance function includes weighting of the sum of said three digital color component signals with respect to one of said three digital color component signals.

68. The method of claim 49, wherein the digital word size of each of said digital color components from which said luminance function is determined is six bits.

69. The method of claim 68, wherein the digital word size of said color components is reduced to four bits in said combinations of run lengths and color components.

70. The method of claim 69, wherein each said combination of run length and color components is coded as at least a sixteen bit digital word.

71. A system for compressing and decompressing digital color video data in a video telecommunication system for transmitting and receiving signal for a plurality of video picture frames, with each picture frame comprising a plurality of scan lines composed of a plurality of pixels, and each pixel in said picture frame comprising three digital color components, said system comprising:

(a) means for determining a luminance function for each pixel based upon at least one of said three digital color components;

(b) means for determining at least one decision parameter for at least a substantial portion of the pixels in the scan lines of said picture frame based upon the difference of said luminance function between pixels a predetermined distance from at least one other pixel on each scan line;

(c) means for comparing said at least one decision parameter with a corresponding threshold value to determine starting pixels and ending pixels for run lengths of sequentially related pixels in said scan lines, said run lengths being of a first digital word size, and said three color components being of second, third and fourth digital word sizes, respectively, for each said run length;

(d) means for encoding all of said digital color components in said picture frame according to a look up table of digitally compressed color codes of said most visually significant color combinations of a fifth digital word size smaller than the sum of said second, third and fourth digital word sizes;

(e) means for encoding a plurality of combination of said run lengths and digitally compressed color codes representing at least a portion of said picture frame;

(f) comparing said run lengths and digitally compressed color codes of said current picture frame with the run lengths and digitally compressed color codes of a previous picture frame to determine changes from said previous picture frame to said current frame; and (g) means for encoding said changes from said previous picture frame to said current picture frame for at least a portion of said picture frame, whereby once an initial picture frame is encoded, only those changes in subsequent picture frames are encoded;

(h) means for transmitting said encoded changes from a previous picture frame to a current picture frame of said run lengths and said digitally compressed color codes;

(i) means for receiving said encoded changes from a previous picture frame to a current picture frame of said transmitted encoded run lengths and said digitally compressed color codes to be decompressed and decoded;

(j) means for decoding said digitally compressed color component codes according to said look up table to form a color components table for each of said three digital color components for each said run length, each of said three decoded color components having sixth, seventh, and eighth digital word sizes, respectively;

(k) means for storing said run length and said corresponding color components in an array in a buffer memory means of run length and color component data representing said plurality of scan lines in said picture frame; and (l) means for generating a color video display signal representing said three color component codes from said run length and associated color components for the scan lines of said picture frame for each pixel of said picture frame by mapping the pixels in said run length from a starting pixel for said run length to an end pixel of said run length to the end of the portion each scan line to be mapped.

72. The system of claim 71, wherein said means for comparing said at least one decision parameter with a threshold value comprises means for determining the rate of change of said at least one decision parameter for each of said pixels for which said luminance function differences have been determined; and means for comparing said rates of change with at least one predetermined adaptive difference rate of change threshold to determine which of said pixels represent points of change of said luminance function.

73. The system of claim 71, wherein said means for comparing said at least one decision parameter with a threshold value comprises means for comparing said at least one decision parameter with a corresponding plurality of thresholds to determine which of said pixels represent points of change of said luminance function.

74. The system of claim 71, wherein said three digital color components represent red, green and blue color video components, and said first, second, and third digital word sizes are equal.

75. The system of claim 71, wherein each said combination of run length and color components is coded as at least a sixteen bit digital word.

76. The system of claim 71, further including means for concatenating run lengths in said plurality of combinations of run lengths and color components for combinations having color components whose differences are less than a predetermined color difference threshold.

77. The system of claim 71, further including means for encoding a table of run lengths and compressed color codes representing only those differences from one scan line to the next adjacent scan line in a picture frame in one direction, for each picture frame.

78. The system of claim 71, wherein said means for generating a color video display signal from said run length and associated color components comprises means for mapping said starting pixel for a run length according to the associated color component, and means for mapping the remaining pixels in said run length by interpolating a smooth color transition to the starting pixel of the next run length to the end of the portion of each said scan line to be mapped.

79. The system of claim 71, further including means for dividing said run length and color component combinations into a plurality of unconcatenated run length and digital color component combinations having a run length portion of a ninth digital word size, for each run length and color component combination having a run length value greater than said ninth digital word size.

80. The system of claim 71, wherein said combinations of run length and color component codes have been encoded as a table of values representing only those differences from one scan line to the next adjacent scan line in a picture frame in one direction, for each picture frame, further including means for decoding said table of run lengths and digitally compressed color codes, and means for storing only those changes from one scan line to the next adjacent scan line in a picture frame in said direction in said array.

81. The system of claim 71, wherein distinctive edges of an image segment that has moved, that has been determined as a sequence of combinations of run length and compressed color codes in at least one scan line, have been included in a table for each picture frame representing changes in said sequences as movement of said image segment from one frame to another frame sequentially, and further including means for storing said changes in said sequences of combinations of run lengths and compressed color codes in said array.

82. The system of claim 71, further comprising means for displaying said reconstructed picture.

83. The system of claim 71, wherein said means for encoding changes from one picture frame to the next picture frame includes means for determining distinctive edges of an image segment that has moved as a sequence of combinations of run length and compressed color codes in at least one scan line for each picture frame, and means for encoding in said table of changes the changes in at least one of said sequences between distinctive edges as a table representing a movement of said image segment from one frame to another frame sequentially.

84. The system of claim 83, wherein said movement encoded is selected from the group consisting of horizontal shifting, shrinking, growing, vertical displacement, horizontal shifting and shrinking, horizontal shifting and growing, horizontal shifting and vertical displacement, vertical displacement and shrinking, and vertical displacement and growing.

85. The system of claim 71, wherein said means for storing said run length associated color components in a buffer memory means comprises means for alternately storing said run length and color components to a first buffer memory until a first set of said picture frame data is complete, sequentially storing said run length and associated color components of a next set of picture frame data to a second buffer memory until said next set of picture frame data is complete, and repeating said storing in said first and second buffer memories for subsequent picture frames.

86. The system of claim 85, further comprising means for sequentially displaying picture frames from said first buffer memory and said second buffer memory as each picture frame in each said buffer memory is completed.

87. The system of claim 71, wherein said means for determining luminance function comprises means for summing said three digital component signals.

88. The system of claim 87, wherein said luminance function has a digital word size of eight bits.

89. The system of claim 87, wherein said means for determining said luminance function includes means for weighting of the sum of said three digital color component signals with respect to one of said three digital color component signals.

90. The system of claim 71, wherein the digital word size of each of said digital color components from which said luminance function is determined is six bits.

91. The system of claim 90, including means for reducing the digital word size of said color components to four bits in said combinations of run lengths and color components.

92. The system of claim 91, wherein each said combination of run length and color components is coded as at least a sixteen bit digital word.

* * * * *

UNITED STATES PATENT AND TRADEMARK OFFICE
CERTIFICATE OF CORRECTION

PATENT NO. : 4,847,677
DATED : July 11, 1989
INVENTOR(S) : Music, et al.

It is certified that error appears in the above-identified patent and that said Letters Patent is hereby corrected as shown below:

Column 15, line 58, delete "on" and insert therefor --one--;

Column 23, line 33, after "representative" insert --colors are within the color block for those colors, the--;

Column 29, line 48, delete "on" and insert therefor --one--;

Column 33, line 31, after "parameter" insert --with--.

Signed and Sealed this

Ninth Day of October, 1990

Attest:

HARRY F. MANBECK, JR.

*Attesting Officer*  *Commissioner of Patents and Trademarks*